April 15, 1969 J. K. McGEE 3,439,346

RECORD READING SYSTEM FOR SIMULTANEOUS CONTROL OF A PLURALITY OF DEVICES

Filed Aug. 17, 1966 Sheet 1 of 6

INVENTOR.
JOHN K. McGEE,
BY
Wolfe, Hubbard, Voit & Osann
ATTORNEYS.

INVENTOR.
JOHN K. McGEE,
BY
Wolfe, Hubbard, Voit & Osann
ATTORNEYS.

INVENTOR.
JOHN K. McGEE,
BY
Wolfe, Hubbard, Voit + Osann
ATTORNEYS.

INVENTOR.
JOHN K. McGEE,
BY
Wolfe, Hubbard, Voit & Osann
ATTORNEYS.

INVENTOR.
JOHN K. McGEE,
BY
Wolfe, Hubbard, Voit & Osann
ATTORNEYS.

INVENTOR.
JOHN K. McGEE,
BY
Wolfe, Hubbard, Voit & Osann
ATTORNEYS.

United States Patent Office 3,439,346 Patented Apr. 15, 1969

3,439,346

RECORD READING SYSTEM FOR SIMULTANEOUS CONTROL OF A PLURALITY OF DEVICES

John K. McGee, Houston, Tex., assignor to Giddings & Lewis Inc., a corporation of Wisconsin Filed Aug. 17, 1966, Ser. No. 572,991
Int. Cl. G06f *11/00*
U.S. Cl. 340—172.5 45 Claims

TABLE OF CONTENTS OF THE SPECIFICATION

Column
A. An Exemplary Machine Tool ... 4
B. A Typical Data Processing Director System ... 5
C. A Representative Record Medium ... 8
D. Symbols and Conventions ... 10
E. Tape Reader and the Data Processor Storage Registers ... 12
F. The Reader and Information Transfer Controls for Handling A and B Data ... 15
(1) If "Need" and "Have" are Equal ... 18
(2) If "Need" and "Have" are Not Equal ... 21
(3) When the Hunt is Successful; Accepting the Needed Type of Data ... 24
(4) Reverse Searching to Return Tape to First Unused Block ... 25
(5) Skipping Blocks From Which Data Has Already Been Accepted ... 28
G. Stopping the Operation of the System ... 31
(1) Mandatory Stopping in Response to an E Code ... 31
(2) Operator's Optional Stop in Response to a P Code ... 31
(3) Operator's Selected Stop ... 32
H. Prevention of Hunting Beyond a Stopping or Recoordination Point on the Tape ... 33
(1) Limitation of Hunting When an E Code is Read ... 34
(2) Limitation of Hunting When a P Code is Read ... 36
(3) Limitation of Hunting When an Operator's Selected Stop is Reached ... 37
I. Starting the System ... 38
J. Résumé of Operation ... 40
(1) If the A Head Executes Block N001 Before the B Head Executes Block N002 ... 41
(2) If the B Head Executes Block N002 Before the A Head Executes Block N001 ... 42
(3) Repeated Hunting ... 43

ABSTRACT OF THE DISCLOSURE

A system for reading an elongated record or tape containing randomly interspersed blocks of two or more types (A or B) of digital data into data processing apparatus so as to continuously control two or more (A and B) utilization devices such as servomechanisms, and wherein different blocks of data are sufficient to keep a utilization device busy for different periods of time. All A data blocks are used in the order of their appearance on the tape without regard to any B data blocks; and all B data blocks are used in their order of appearance on the tape without regard to A data blocks. Apparatus signals when data of either type (A or B) is needed, and means respond thereto for starting the tape reader forwardly. As each block is sensed, means create a signal indicating whether that block contains A or B data. If the block contains the needed type of data, the signals read therefrom are accepted and the tape reader is stopped. If the sensed block, or any number of blocks, contains data of the type not needed, means cause the data signals therefrom to be rejected or ignored (the block is skipped) and the reader continues running until a block containing the needed type of data is found, read and accepted. Control means then stop the reader and cause it to run in a reverse direction until the beginning of the first skipped and previously unused block of data is again disposed in the tape reader. Storing and control devices cause any previously accepted block of data to be skipped even though it contains data of the type needed. Other apparatus performs auxiliary functions such as limiting the extent to which the system will search forwardly on the record.

The present invention relates in general to systems wherein information read from a punched tape or the like is supplied to data processing apparatus which in turn controls the operations of a utilization device. Such systems are exemplified by the now well-known "numerical control" systems for machine tools or the like in which a numerically defined program of successive motions to be executed along a continuous path is represented on successive blocks of, and read from, a punched tape into a "director" which governs the servo drives for the movable elements of the machine tool.

In the majority of such numerical control systems for machine tools, a single cutter is moved simultaneously along two or more axes relative to a workpiece so that the desired shape or contour is formed on the latter. Successive blocks of numerical information are read from the punched tape in a fixed sequence in order to keep the director supplied with operating data, each block commanding simultaneous motions through X and Y axis component distances to produce a resultant increment of motion at a predetermined angle relative to the axes. Such arrangements may be termed "one-headed" machine tools and controls, since only a single tool-carrying head is employed, although it may be moved simultaneously along two or more axes.

For those machine tools having two or more independently movable tool-carrying heads, it has been the prior practice to numerically control the motions of only one head at a time. When simultaneous contouring operation of two heads has been attempted, it has been necessary carefully to arrange the sequence of the blocks of data for the two heads on the punched tape in order that straight sequential reading of those blocks will periodically supply input data in a manner such that both heads are kept reasonably busy, without long periods of idleness. But even the latter procedure, with its tedious and careful determination of the particular order in which the blocks of data appear on the punched tape, is in many cases impractical because a cutter head remaining at rest midway through a complete path may produce objectionable marks on a workpiece.

The instant invention relates more particularly to the control of a reader for a punched tape or the like so as to supply successive sets of information to a data processor or director which causes the simultaneous, programmed operation of two or more utilization devices, e.g., two separate heads of the same or different machine tools, each head being movable along one or more axes relative to a workpiece.

It is the general aim of the invention to provide a system for supplying successive sets of input information from a record medium to data processing apparatus capable of controlling two or more separate utilization devices—and in a manner such that the utilization devices operate simultaneously and substantially continuously. In this respect, it is a specific object to make the operations of a two-headed numerically controlled machine tool faster, more efficient, and more economical than has heretofore been possible. And it is another object of the invention to avoid objectionable marking on the workpiece in a two-headed numerically controlled contouring machine by preventing either head from coming to rest at any but a non-critical point in an overall program of motion.

A coordinate major objective of the invention is to make possible such a system in which a programmer need exercise no special care in arriving at the particular order in which A and B blocks of data for the control of A and B utilization devices appear on the record medium. Indeed, it is a principal feature of the invention to be disclosed that the A and B data blocks may be randomly interspersed in their order of appearance on the record medium, and the commands of each block may require any of a wide range of time periods for execution, and yet such blocks will be sensed and utilized when their respective contents are needed for the continued operation of the A and B devices.

Another principal object of the invention is to provide a control system which automatically supplies sets of A or B data from a record medium to a data processor for the respective control of A and B utilization devices, in a manner such that the proper type of data is supplied whenever it is needed, such that the A data sets are utilized in their order of appearance, and such that the B data sets are utilized in the order of their appearance—despite the facts that the A and B data blocks appear randomly interspersed with one another on the record medium, and each block may require any of a wide range of time periods for execution of the command which its data represents.

Still another object is to provide such a system for controlling two or more utilization devices, and wherein the feed rates or time periods for successive increments of operation for one of the utilization devices may be changed (relative to those originally designated by a program on the record medium) by adaptive control or manual override, but without incurring non-continuous operation of either utilization device.

A further object of the invention is to provide a system in which a record medium (e.g., punched tape, magnetic tape, a deck of punched cards, etc.) is "searched" so as to hunt for numerical data applicable to the control of a first device whenever such numerical data is necessary for continued operation of that device, any intervening numerical data applicable to the control of a second device simply being ignored or skipped—and yet without losing the availability of, or proper response to, the data which is skipped.

Another object is to provide a system which will search forwardly on a record medium containing two types of randomly interspersed data blocks applicable respectively to the control of A and B utilization devices until it finds and accepts a block of data for the particular device for which more information is needed, and which will then reversely transport the record medium to the first data block previously skipped and unused.

Still another object is to provide a control system of the type noted above wherein a record medium may be searched several times to locate, read and accept widely separated blocks of data applicable to a particular one of two or more utilization devices, yet wherein any block of data for that particular device previously read and accepted will simply be ignored.

It is another object to avoid searching back and forth through an entire record medium each time new operating data is required, by limiting reverse movement of the record medium to the last block of previously unused data.

It is an additional object to make certain that no block of data which is skipped or ignored as a record medium passes through a reader is lost or not utilized, and to accomplish this by storing information (such as a block number) identifying the first unused block which is skipped, and after acceptance of some other block of data, by reversing the transport of the record medium until the latter is returned to the beginning of the block identified by the stored information.

Yet another object of the invention is to prevent one utilization device from getting too far ahead of a second utilization device in the execution of their respective programs of motion, so that collisions of the two controlled members may be avoided.

Still another object of the invention is to provide a searching system in which the proper one of two types of data is located and read from a record medium whenever there is a need for that particular one type of data, yet in which data will not be read and accepted from the record medium beyond a point at which all operations of the composite system are to be stopped.

Other objects and advantages will become apparent as the following description proceeds, taken in conjunction with the accompanying drawings, in which.

Figure 4:
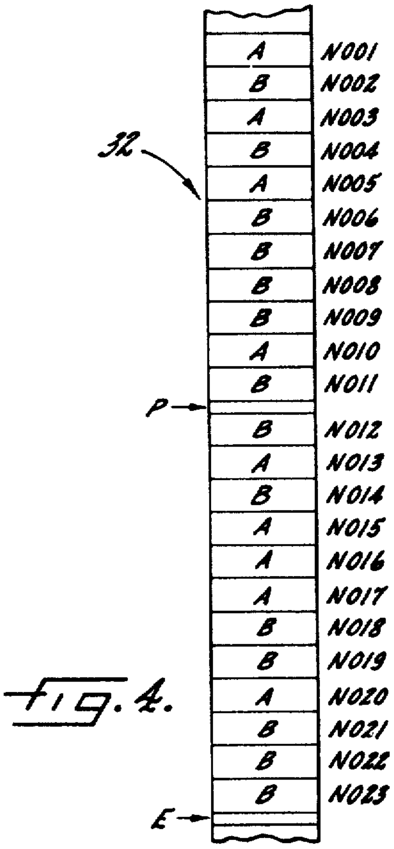
Figure 2:
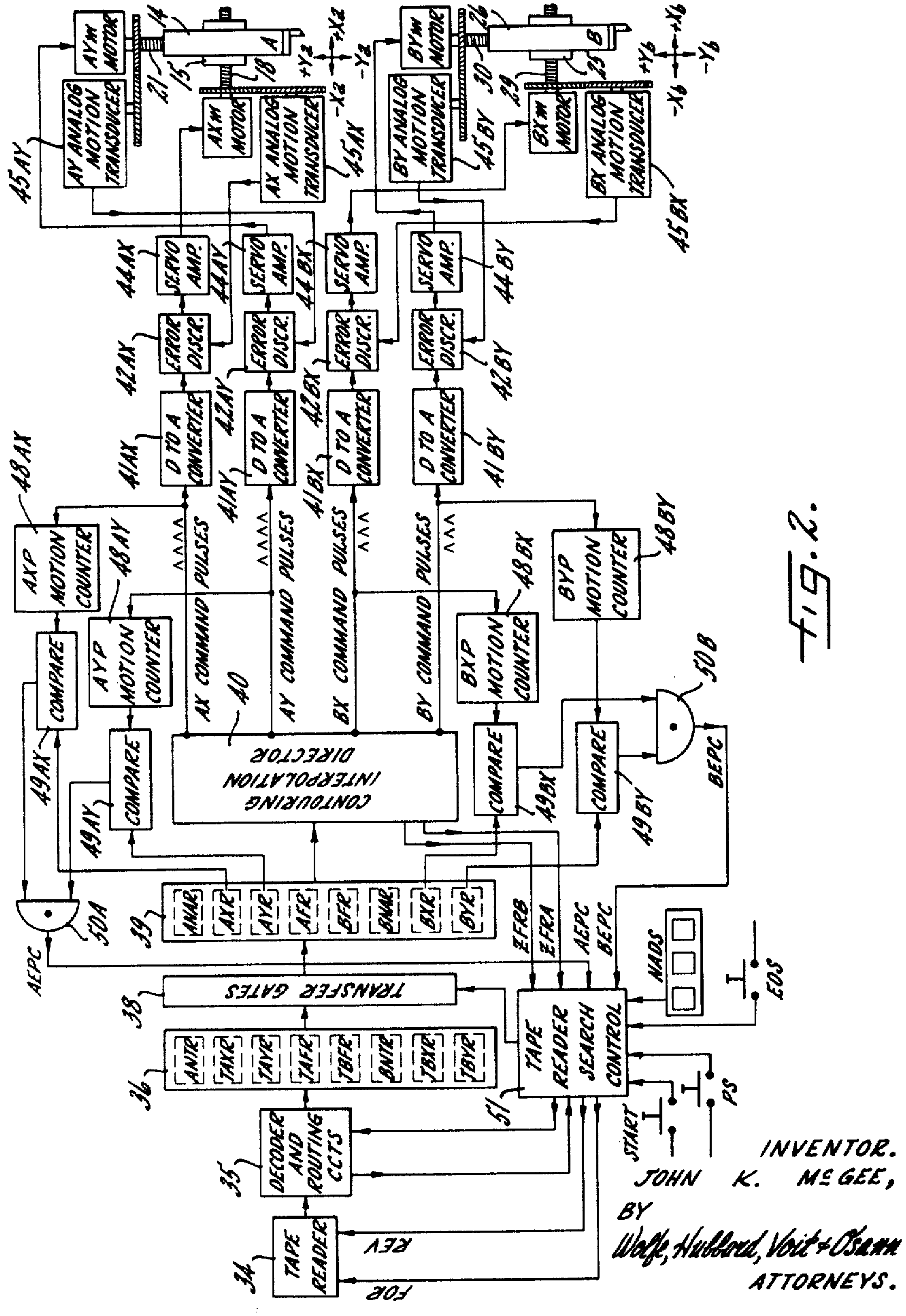
FIG. 2 is a block-and-line diagrammatic illustration of a data processing director system for controlling the simultaneous motions of the two heads of the machine tool.

FIG. 4 is a representation of a greater length of the record medium, illustrating a larger number of randomly interspersed blocks containing different types of data respectively defining commanded motion increments for the two heads of the machine tool; and FIGS. *5a*, *5b*, *5c* and *5d* when joined along the indicated junction lines collectively illustrate in more detail a portion of the numerical control system shown in FIG. 2, such figures constituting a block-and-line diagram of an exemplary embodiment of the record reading and data supplying apparatus of the present invention.

While the invention has been shown and will be described in some detail with reference to a particular embodiment thereof, there is no intention that it thus be limited to such detail. On the contrary, it is intended here to cover all modificaions, alternatives and equivalents falling within the spirit and scope of the invention as defined by the appended claims.

A. *An exemplary machine tool*

In order to make clear one environment in which the present invention will find especially advantageous use, the invention will here be described with reference to supplying data from a record medium to a numerical contouring control system for a two-headed machine tool, the two heads being illustrative of two utilization devices which may execute predetermined programs of operation under the control of a data processing director. While in this environment the machine tool heads execute programs of motion in which their distances and velocities of movement along plural axes are determined by numerical input data, the invention will also be useful in the operation of utilization devices wherein variables other than moton, for example, speeds, pressures or temperatures, are being controlled. Moreover, it will become apparent from the description which follows, that the system may be expanded to control more than two heads, but only two will be described for purposes of explanation.

A vertical turret lathe 10 (shown in FIG. 1) is typical of the many different types of machine tools which may be numerically controlled. It includes a work table 11 rotatable about a vertical axis and adapted to carry a workpiece 12 which is to be machined to a desired contoured shape. Representative of a first utilization device which is to execute a numerically defined motion program, a turret head A is fixed to and vertically movable with a ram 14 which is slidable within vertical ways (not shown) formed on a saddle 15, the latter in turn being movable horizontally along the ways of a rail which is supported at its opposite ends by spaced columns 16, 17. A plurality of tools, such as a cutter 19, may be mounted in an indexable turret of the head A, and selectively brought to a working position. The cutter 19 may thus be moved along horizontal and vertical X and Y axes relative to the workpiece 12, and by proper coordination or proportioning of the X and Y axis components of movement and velocities, the cutter will move through desired angles or arcs in space in order to cut a contour on the workpiece 12. To produce such controlled movement of the A head along the X and Y axes, the saddle 15 includes a nut (not shown) engaged with a lead screw 18 driven through a gear box 20 from a reversible servomotor AX*m*. As the latter motor is caused to rotate in one direction or the other at different speeds, the saddle 15 will be moved horizontally in +X or −X directions, and at velocities determined by the speed of the motor. Correspondingly, the ram 14 carries a nut (not shown) engaged with a vertically disposed lead screw 21 driven by reversible servomotor AY*m*, so that energization of that motor in one direction or the other moves the A head and the cutter 19 in +Y or −Y directions.

It is often possible and highly desirable to cause two cutters to operate simultaneously, thereby increasing the speed and efficiency of completing all of the necessary machining operations on a given workpiece. Representative of a second utilization device which may be controlled to simultaneously execute its own numerically defined motion program is a side head B adapted to mount a second cutting tool 24. The side head B is carried by the inner end of a ram 25 horizontally slidable within a saddle 26 which in turn is vertically movable along ways formed on the column 17. As here shown in simplified form, the ram 25 carries a nut 28 engaged with a lead screw 29 selectively driven in one direction or the other by a reversible servomotor BX*m* so that the side head B can be moved through desired distances and at desired velocities in +X or −X directions. Similarly, the saddle 26 carries a nut (not shown) engaged with a vertical lead screw 30 reversibly driven by a servomotor BY*m* so that the head B may be driven through desired distances, at desired velocities and in either +Y or −Y directions.

It will be appreciated by those skilled in the art that while the cutter 19 carried by the A head is executing motions to machine a curved or contoured surface on the inside of the cylindrical workpiece 12, the B head and its cutter 24 may be simultaneously executing a program of motions to cut a desired shape on the outside surface of the workpiece. Alternatively, the A head and its cutter 19 may be operating near the upper end of the workpiece while the B head and its cutter 24 are operating near the bottom portion of the workpiece.

B. *A typical data processing director system*

Figure 1:
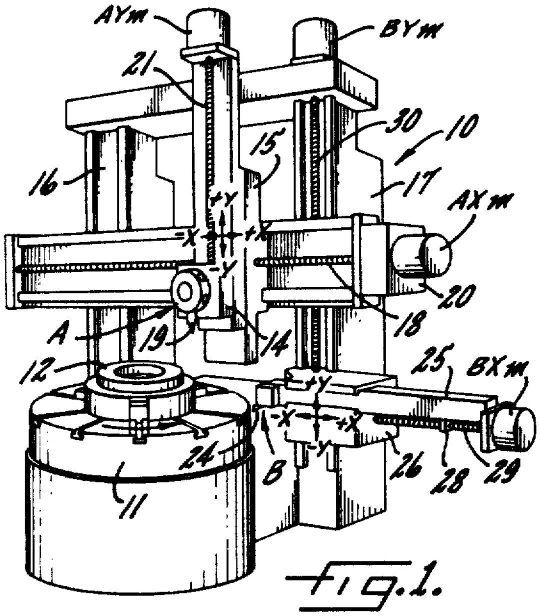
FIGURE 1 is a perspective view of a two-headed machine tool here shown to make clear one example of two utilization devices controlled by a data processor which receives numerical information from a punched tape.

The servomotors shown in FIG. 1 form a part of closed loop servo drives which are controlled by data processing apparatus of the type exemplified in FIG. 2. The data processor receives its input information from a record medium (such as a punched tape 32 to be described with reference to FIGS. 3 and 4) which contains "blocks" of data defining the successive increments of motion necessary for the cutters 19 and 24 to machine the desired surface contours on the workpiece 12.

As shown in FIG. 2, the exemplary numerical control system includes a tape reader 34 which reads and signals the identity of the data represented by successive portions of the punched tape, the reader output signals being passed through suitable decoder and routing circuits 35 into temporary storage registers 36. As will be explained more fully below, separate temporary storage registers TAXR, TAYR receive the X and Y axis data of the A head; temporary storage registers TBXR, TBYR are employed to receive the X and Y axis data for the B head; and temporary registers ANTR and BNTR receive and store the block numbers for the A and B data blocks read by the reader and accepted. Temporary feed rate storage registers TAFR and TBFR receive signals from the tape reader 34 which designate the resultant velocity or feed rate at which the A and B heads are to be moved in executing each block of data.

The numerical data which is stored in the temporary registers 36 may be quickly transferred through gates 38 into active storage registers 39 which supply number-representing signals to a contouring interpolation director 40. It will suffice for the moment to observe that there is an active register corresponding to each temporary register, and that the former are here designated AXR, AYR, BXR, BYR, ANAR, BNAR, AFR and BFR.

The details of the director itself will not here be described, inasmuch as a variety of interpolating directors are per se well known in the art. The director may operate in a linear, circular or other interpolating fashion. In response to each block of A head data present in the active registers 39, the director 40 may, for example, produce two trains of command pulses AX and AY which by their respective numbers and frequencies represent the desired extends and rates of motion to be executed by the A head along the X and Y axes therefor. In the present simplified illustration, these command pulses for the X and Y axes of the A head are transmitted to respective digital-to-analogue converters 41AX and 41AY, the latter producing modulated analogue variations (such as a changing voltage, phase or the like) which are in turn supplied as one input signal to corresponding error discriminators 42AX and 42AY. Such input signals to these discriminators thus represent the instantaneous commanded positions for the saddle 15 and the ram 14 associated with the A head, and so long as the actual positions of these elements do not agree with the command positions, the discriminators supply error signals through servo amplifiers 44AX and 44AY to the motors AX*m* and AY*m*, respectively. Associated position with each of the lead screws 18 and 21 are analog transducers 45AX and 45AY which feed back signals representing actual positions of the saddle 15 and the ram 14 to the error discriminators 42AX and 42AY. Thus, when command pulses are produced for the X and Y axes of the A head, the motions of the A head along those two axes will be caused to agree in extent, sense and rates with the number, sign, and frequency of the X and Y command pulses.

The contouring director 40 may include a completely separate section for processing B head data and producing X and Y command pulses for controlling the B head servomotors BX*m* and BY*m*. Alternatively, the contouring directors have many components which are common to and shared by the two portions which convert A and B data into A and B head command pulses. As here shown, the closed loop servo controls for the X and Y axes of the B head are substantially identical to those described above for the A head and include digital-to-analogue converters 41BX, 41BY; error discriminators 42BX, 42BY; and servo amplifiers 44BX, 44BY. Transducers 45BX and 45BY supply feedback signals indicative of the actual positions of the ram 25 and the saddle 26, so that the instantaneous positions of the B head along its X and Y axes are caused to agree with the instantaneous command positions as represented by the BX and BY trains of command pulses.

Provision is made in the apparatus of FIG. 2 to create a signal indicative of the fact that the A head has completed the execution of an incremental motion called for by a given block on the punched tape. For this purpose, the AX and AY command pulses are respectively supplied to motion counters 48AX and 48AY which, by signalling the number stored therein, indicate the instantaneous total extent of movement along the AX and AY axes as it occurs in response to those command pulses. The commanded distance components along the AX and AY axes are stored in active registers AXR and AYR, having been read from one block of the record medium into the temporary registers 36 and transferred through the gates 38 to the active registers 39. A first compare device 49AX receives the number-representing signals from the counter 48AX and the active register AXR, and produces an output signal as soon as these two numbers become equal, thereby indicating that the executed displacement component along the X axis is equal to the commanded displacement. Such output signal is caused (by means not shown) to terminate the AX command pulses until fresh X axis data for the A head is transferred into the active register AXR.

Similarly, a compare device 49AY receives input signals from the active storage register AYR and from the motion counter 48AY, producing an output signal when the compared numbers become equal and terminating (by means not shown) the AY command pulses until new data is transferred into the register AYR.

The output signals from the two compare devices 49AX, 49AY are supplied to an AND gate 50A, so that when both such signals exist simultaneously, the AND gate 50A produces an output signal AEPC (A head "end point compare") indicating that the motion commanded by a given block of data for the A head stored in the registers AXR and AYR has been fully executed. This means that the director 40 is ready to receive the next set of numerical data for continued movement of the A head, and thus that A data then held in the temporary registers 36 may be dumped through the gates 38 into the active registers 39. Because such dumping will leave the temporary registers 36 without fresh A head data in them, the AEPC signal is applied to a tape reader search control 51 which in turn causes the tape reader 34 to be placed in operation so as to read a new block of A data into the temporary registers while the A head is executing the movement commanded by that block of data newly transferred into the active registers. The details of the tape reader search control 51 will be described below with reference to FIGS. 5*a–d*.

The corresponding B head portions of the system shown in FIG. 2—including motion counters 48BX and 48BY, active storage registers BXR and BYR, comparing devices 49BX and 49BY, and an AND gate 50B—are organized and operate in an identical manner. When one block of B head data contained in the active registers BXR and BYR has been fully executed, the AND gate 50B will produce a B head "end point compare" signal BEPC, and the latter is applied to the search control 51 to indicate that the system is ready to receive additional data for continued operation of the B head. As will be explained more fully hereinafter, the BEPC signal normally causes B data contained in the temporary registers 36 to be transferred into the active registers 39, and also causes the tape reader 34 to be started so as to supply another block of B data to the temporary registers.

The transfer of successive blocks of A or B data into the active registers 39 from the temporary registers 36 occurs very quickly, so that the A and B heads need not come to a complete stop after executing each block of numerical command information. Rather, each head moves continuously during successive time intervals corresponding to each block of its data and with smooth or continuous transitions in the directions or velocities which are called for by successive blocks. For purposes to be described below, however, the director 40 includes circuitry (not shown) arranged to produce signals ZFRA or ZFRB which respectively indicate that the A or B head is at rest with a zero feed rate. Thus, the signal ZFRA or the signal ZFRB will appear and be transmited to the search control 51 whenever the system has been stopped and the A or B head is at rest because no unprocessed data is present in the A or B active registers.

From the foregoing, those skilled in the art will appreciate that the A and B heads of the vertical turret lathe 10 will each execute successive increments of motions in response to successive sets or blocks of A or B numerical data supplied to the temporary registers 36 and thereafter transferred into the active registers 39. Noteworthy is the fact that the numerical command data is received intermittently in blocks, but the commanded movement of the two heads must proceed substantially continuously. Each increment of motion for a given head, and which forms a part of a continuous path of motion, is commanded by one set or block of numerical data, and it involves displacement of that head through a predetermined distance (which is the resultant of the component displacements along the X and Y axes), at a predetermined angle (the tangent of that angle being the ratio of the X and Y axis component distance), and at a velocity which depends upon the commanded feed rate. For example, a block of data calling for the A head to move ten inches at a rate of one inch per minute will require the data processing director to operate on that data and supply signals to the A head controls during a ten minute interval; but a block of data calling for two inches of movement at a feed rate of two inches per minute will require only one minute for execution. Thus, the A and B heads may complete the execution of the command data held in their respective active registers at different and uncoordinated instants. Thus, it may be observed that each block of data supplied to the data processing director keeps one of the two heads busy for a particular but unrestricted time interval, that is, any block depending upon the nature of the command data therein, may require from say two seconds to ten minutes for execution. Thus, when a block of data for a given head is read from a record medium and begins controlling the movements of the head, the system has no way of determining how long it will be before fresh data will be needed. Normally, if the A head should complete the execution of a given block while the B head is still executing one of its data blocks, and if the next block of data appearing on the record medium is for the B head, the A head would simply have to remain idle until the B head reached the end of its commanded motion and the data processing apparatus was ready to receive additional B data from the tape reader. It is to the elimination of this inefficient waiting that the present invention is primarily directed.

C. *A representative record medium*

Figure 3:
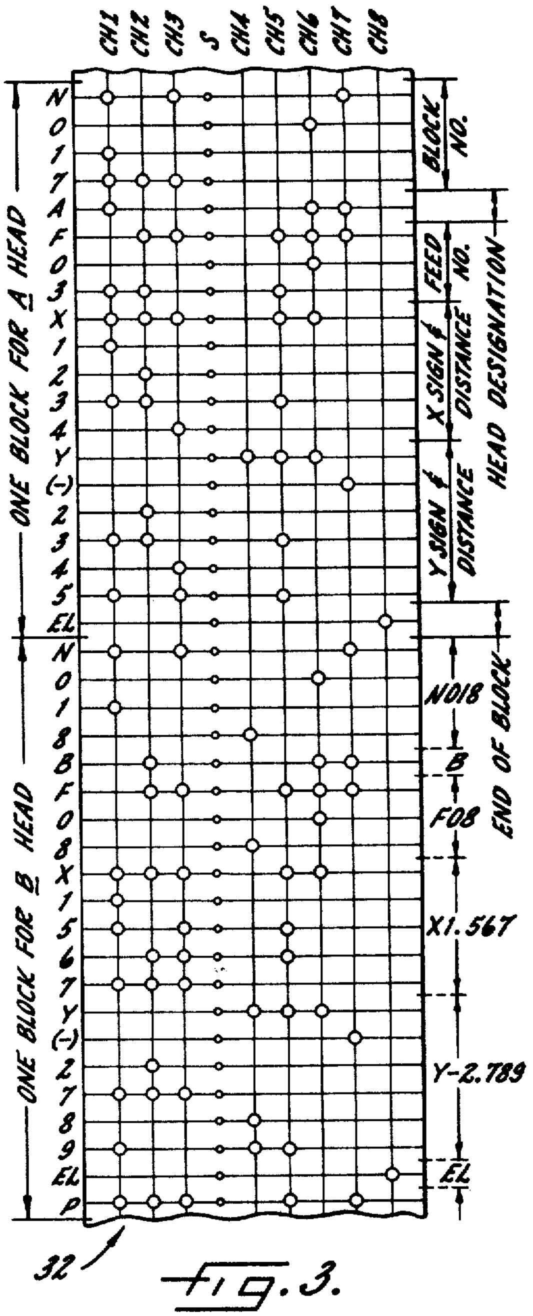
FIG. 3 illustrates a fragmentary portion of an exemplary record medium, and shows two typical "blocks" of data represented thereon by successive rows of coded indicia.

The punched tape 32 (FIGS. 3 and 4) is merely representative of the variety of record mediums which can be utilized in the apparatus to be described, but familiarity with the punched tape format and coding here illustrated will facilitate an understanding of the operation of the tape search control 51 shown in detail by FIGS. 5*a–d*. In general terms, the elongated punched tape 32 fragmentarily shown in FIGS. 3 and 4 is made of paper, plastic or the like and contains eight longitudinal channels 1–8 plus a lengthwise column of sprocket holes S to facilitate transport through a reader. Each transverse row on the tape may thus receive holes punched in different combinations of the eight channels to represent by any selected code notation different numbers, letters, or symbols. In the present instance, the familiar "Flex-O-Writer" (trademark) coding is employed, and the combination of holes in each row of the tape shown in FIG. 3 represents the letter, number of symbol labeled at the left side. It may be observed that the ten decimal digits 0 through 9 are designated by combinations of holes applied in channels 1, 2, 3 and 4, these being assigned the respective weights of 1, 2, 4 and 8 so that each decimal digit is represented in 1248 binary coded decimal notation.

The command data appears on the punched tape 32 in successive "blocks" with each block being constituted by a plurality of successive transverse rows. Any given block may contain numerical command data for either the A head or the B head of the machine tool which is ultimately to be controlled. Each block thus includes rows of indicia designating a direction and extent of a distance component to be translated along the X axis, and designating a direction and extent of a component distance to be executed along the Y axis. An F code number also appears in those blocks where a feed rate different from that called for by a previous block containing data for the same head is required.

Each block of data begins with a block number represented by four coded rows of indicia, the block numbers being arranged in ascending order for the successive blocks irrespective of whether those blocks contain A or B data. Thus, as shown in FIG. 3, the first block of data begins with the block number representation N017, whereas the second block begins with the block number representation N018. The N is simply an address symbol indicative of the fact that the following three decimal digits represent a block number.

Following the N number in each block of data, there is an A or B code to designate whether the numerical data in that block is applicable to the control of the A or B head, respectively. Thus, as shown in FIG. 3, the first block contains a row of holes representing the letter A after the block number N017; and the second block similarly contains a row of holes representing the letter B following the block number N018.

Feed rate data, X axis data and Y axis data then appear in each block following the A or B code, and the end of each block is designated by a code row for the symbol EL. Thus, as illustrated in FIG. 3, the first block of data contains three rows of holes representing a feed rate number F03, whereas the second block of data contains three rows of holes representing F08. Then, the first block of data contains a succession of holes designating the X and Y axis distance components X1.234 and Y–2.345; and the second block of data in FIG. 3 includes the X and Y axis component designations X1.567 and Y–2.789.

The various letter symbols which appear on the punched tape 32 serves as "addresses," and they are decoded, as hereinafter explained, so as to indicate the nature and significance of the numerical characters which immediately follow them. Thus, if no feed rate number or no X number is necessary in any given block of data, these numbers and their address letters F and X may simply by omitted, and the tape reader will respond to the existing address codes and numbers which follow them.

Each block terminates with an EL code, and this latter code is employed to tell the tape reader and its control circuits that each block of information has been fully read.

At various selected points along the punched tape a row of holes representing the symbol P may be provided for "recoordination" and "planned stop" functions hereinafter explained. Such a P code has been shown for the last row of the tape 32 in FIG. 3. The symbol P stands for a "planned stop" or an operator's optional stopping point. If the operator of the machine tool depresses an enabling switch, then the response to the reading of a P code will be to stop the data processing apparatus and the machine tool. This arrangement, which is per se known in the art, permits the machine tool operator optionally to stop or interrupt the machine tool at various appropriate points in the overall program of motion, such optional stopping points being selected by the programmer who in the first instance prepares the punched tape. As an example, the operator might enable the "planned stop" portion of the system when he feels it is desirable to measure the workpiece being machined or to check the condition of a cutter tool at a convenient point for interrupting the machine tool's operations. Once the measuring or checking has been accomplished the operator may simply start the system by pressing a start switch.

Although a separate special code might be selected and applied by the programmer at various locations along the punched tape, the P codes in the apparatus to be described serve also as special codes which designate recoordination points. As will be explained hereinafter, when a P code is read the system is prevented from hunting beyond that point on the punched tap until the preceding blocks on the punched tape have been accepted and executed. By inserting P codes in appropriate blocks along the tape, the programmer can thus prevent one head from getting too far advanced relative to the other head in their separate programs of motion, so that the danger of the two heads colliding, or the possibility of one of the heads getting into a portion of its program prior to a necessary tool change, is avoided. This will be treated in more detail below.

As contrasted with an operator's optional stop in response to a P code on the punched tape, the programmer may designate that the entire system is to come to a mandatory stop at any point in the overall program by inserting an E or "end" code after any given block. Such an E code is illustrated at the lower end of the tape 32 shown in FIG. 4. The E code designates either that the entire program motions for both the A and B heads is completed, so that the apparatus may be stopped, or that the machine tool must always be stopped at points mid-way through the overall program to permit the operator to change a cutter tool or perform other essential functions.

The longer, but nevertheless fragmentary, portion of the tape 32 is illustrated in FIG. 4 as containing a greater number of blocks N001 to N023, the details of the coded rows of indicia within each block not being shown. Blocks containing A and B data are randomly interspersed along the tape, as labeled in FIG. 4, and the operation of the system to find and accept the proper type of data will hereinafter be described in detail with reference to FIG. 4.

D. *Symbols and conventions*

Before considering the record reading system which is illustrated by FIGS. 5*a–d*, it will be helpful to note the symbols and conventions which have been employed in those figures to diagrammatically represent different logic devices and signals. In this connection, the system as shown in FIGS. 5*a–d* is assumed to operate on a binary logic basis, i.e., each signal which is produced and responded to may have either a binary "1" or "0" value. These might be, for example, voltage levels of +12 volts and zero volts, respectively. The apparatus as shown in FIGS. 5*a–d* responds affirmatively to binary "1" signals, but when any given signal has a "0" value, that will normally produce no response.

Bistate devices have been here shown as rectangles labeled FF to represent the conventional and well known "flip-flop" type of circuits. As exemplified by the RUN flip-flop (upper left corner of FIG. 5*a*) each flip-flop has set and reset terminals S and R, and true and complement output terminals T and C. These terminals have not been labeled for all of the flip-flops appearing in FIGS. 5*a–d*, but it is to be understood that the upermost input terminal (preceded by a capacitor) is the set input terminal, and the uppermost output terminal is the true output terminal. Each such flip-flop is organized such that it is set to its "1" state in response to the signal on an input line leading through a differentiating capacitor to its set terminals S changing from a binary "0" to a binary "1" level (e.g., from zero volts to +12 volts). Similarly, the flip-flop is reset from its "1" to its "0" state in response to the input signal applied to a line leading through a differentiating capacitor to its reset terminal R changing from a binary "0" to a binary "1" level. Of course, such a 0 to 1 transition applied to the set or reset terminal of the flip-flop produces no effect at all if that flip-flop is already in its "1" or "0" states.

When the flip-flop is in its "1" state, it produces a binary "1" (+12 volts) signal on its output terminal T, and the complement "0" (zero volts) on its output terminal C. Conversely when in its reset or "0" state, the flip-flop produces a binary "0" signal on its true output terminal T and a binary "1" signal on its complement terminal C. Thus, in the case of the flip-flop RUN, it may be assumed that the true terminal T produces a signal RUN thereon which is a "1" or "0," and the complement terminal C has a signal $\overline{\text{RUN}}$ thereon which is a "0" or "1," when the flip-flop is respectively set or reset, i.e., residing in its "1" or "0" state. The other flip-flops all operate according to this assumed convention.

Throughout FIGS. 5*a–d*, AND logic gates have been conventionally shown as half circles with dots therein, in accordance with Boolean notation. As is conventional, it is here assumed that the output line of each such AND gate receives a binary "1" signal thereon only when all of its input lines simultaneously receive a binary "1." If any one of such input signals is a "0," the output signal of the AND gate is a "0."

Multiple gates are shown as rectangles containing the letter G or the word GATES. It is conventionally assumed that the binary "1" or "0" signals appearing on the input lines of such a multiple gate are transferred to the respective output lines only whenever all control input lines receive a binary "1" signal. For example, the gate G1 in FIG. 5*a* transfers the binary "1" and "0" signals existing on its four input lines *a* to corresponding ones of its output lines *b* only when its three control terminals *c* simultaneously receive binary "1" signals. Otherwise, all of the output lines *b* remain at binary "0" levels.

At numerous places in FIGS. 5*a–d* OR circuits have been illustrated as rectangles containing the corresponding Boolean symbol +. These OR circuits are well known per se and it is conventionally assumed that each such OR circuit produces a binary "1" signal on its output line if any one of its input lines receives a binary "1" signal. Only when all input lines of a given OR circuit receive binary "0" signals is the output line therefor at a binary "0" level.

To avoid undue numbers of crossing lines representing signal-carrying conductors in FIGS. 5*a–d*, various interconnections are here symbolically illustrated. In particular, terminals represented by the symbol ◬ are connected to other points in the system, and thus transfer the signals which appear on them to such other points. The other points which receive signals from the ◬ terminals are here represented by the symbol ⊗. Merely by way of example, the RUN ◬ terminal shown in the upper left corner of FIG. 5*a* transfers the RUN signal which appears on it to the RUN ⊗ terminal constituting one input to an AND gate 154 which appears near the lower right corner of FIG. 5*a*.

Throughout FIGS. 5*a–d*, certain logic devices and signals appearing on various conductor lines are designated by alphabetical symbols. In general, the letters chosen for these symbols represent words or phrases which loosely define the significance or function of the designated device or signal. Because these relationships may aid in understanding the description which follows, the various symbols and the words or phrases which they represent will here be, in part, set forth:

| Letter symbol: | General significance |
|---|---|
| AXR | A head, X data, active register. |
| AYR | A head, Y data, active register. |
| BXR | B head, X data, active register. |
| BYR | B head, Y data, active register. |
| TAXR | A head, X data, temporary register. |
| TAYR | A head, Y data, temporary register. |
| TBXR | B head, X data, temporary register. |
| TBYR | B head, Y data, temporary register. |
| ANAR | A head block number, active register. |
| BNAR | B head block number, active register. |
| ANTR | A head block number, temporary register. |
| BNTR | B head block number, temporary register. |
| NTR | Block number, temporary register. |
| A#S | A number store. |
| B#S | B number store. |
| RUN | System running. |
| STFR | Start tape forward. |
| FOR | Forward drive of tape. |
| REV | Reverse drive of tape. |
| NAD | Need A data. |
| NBD | Need B data. |
| HR | Hold read. |
| DHR | Delayed hold read. |
| HAD | Have A data. |
| HBD | Have B data. |
| ADR | A data ready. |
| BDR | B data ready. |
| AEPC | A end point compare. |
| BEPC | B end point compare. |
| RCA | Read clear A data. |
| RCB | Read clear B data. |
| NH= | Need-have equal. |
| NH≠ | Need-have not equal. |
| CPH | Compare per have. |
| NTR>A/BNAR | Block No. in NTR greater than block number in appropriate one of the A or B active registers. |
| NTR≦A/BNAR | Block No. in NTR equal to or less than block number in appropriate one of the A or B active registers. |
| RJB | Reject block. |
| RJBD | Reject block delayed. |
| EHT | Enable hunt. |
| HTA | Hunt A data. |
| HTB | Hunt B data. |
| HTO | Hunt on. |
| STOP | Stop system operation. |
| NADS | Block number address search. |
| EADS | Enable address search. |
| EOS | Enable operator stop. |
| SHO | Search on. |
| PS | Planned stop. |
| EPS | Enable planned stop. |
| NTR=NADS | Block no. in NTR equal to address search block number in NADS. |
| NTR≠NADS | Block no. in NTR not equal to address search block number in NADS. |
| HEP | Hunt end point. |
| RSNAR | Reverse search to block number in active register. |
| NAR=NTR | Block no. in active register equal to block no. in NTR. |
| NAR≠NTR | Block no. in active register not equal to block no. in NTR. |
| CIC | COMPARE I complete. |
| CIIC | COMPARE II complete. |
| CIIIC | COMPARE III complete. |
| EC | Enable compare. |

The complement of any signal represented by a given set of letters is conventionally designated by the same letters to which a superimposed bar is added. For example, when the signal RSNAR is a "1" or "0," the signal $\overline{\text{RSNAR}}$ is a "0" or "1," respectively.

E. *Tape reader and the data processor storage registers*

As one part of the system for transferring information appearing on the punched tape 32 into the data processing apparatus, the record or tape reader 34 is employed to convert each row of coded indicia into corresponding electrical output signals as the tape is transported therethrough. Because the reader 34 may be any one of a variety commercially available and per se known in the art, it has been illustrated only diagrammatically in FIG. 5*a*. As here shown, the punched tape reader include means for selectively transporting the record medium forwardly or reversely through a sensing and signaling device here shown as a tape senser 56, such transport means including a sprocket (not shown) engaged with the tape sprocket holes and driven selectively in either a forward or a reverse direction by the output shaft 58 of a transport mechanism 59 whose input shaft 60 is continuously driven in one direction by a motor 61. The mechanism 59 includes clutching and braking means (not shown) controlled by forward and reverse solenoids FS and RS, so that when neither solenoid is energized, the tape 32 is stationary; when the solenoid FS is energized, the tape is driven forwardly (i.e., in a direction such that the successive blocks on the tape pass through the senser in ascending order of their block numbers); and when the solenoid RS is energized, the tape is driven reversely (i.e., in a direction such that the blocks pass through the senser in descending order of their block numbers).

Within the tape senser 56 are mechanical, pneumatic, or photoelectric hole-sensing elements (not shown) together with means for producing binary "1" electric signals on those ones of the output terminals CH1 through CH8 which correspond to the particular holes present in each row of indicia as it passes. For example, if a given row of holes represents the decimal number seven, and contains holes in channels in 1, 2 and 3, the output terminals CH1, CH2 and CH3 will simultaneously receive momentary binary "1" signals (and the others will remain at binary "0" levels) as that particular row passes the sensing elements. Such "reading" and signaling of the combinations of holes in each row on the punched tape takes place irrespective of whether the tape is being transported forwardly or reversely.

The conductors which lead from the terminals CH1, CH2, CH3 and CH4 are designated as number buses NB because each decimal number read from the tape will be represented in 1248 binary decimal code by signals which appear simultaneously on those particular conductors. On the other hand, any address letter or code other than a number which is represented by the binary signals appearing in different combinations on the tape senser output terminals is converted into a unique response by an address decoder 62. Such decoders are per se known in the art, and the one here shown only in block form functions to produce a binary "1" on that one of its output terminals N, A, B, X, Y, P, EL, or E in response to the corresponding address code being read from a given row on the punched tape. The decoder 62 is of the "memory" type. That is, when any given address letter or symbol is read and signaled on one of the decoder output terminals, such signal will persist until some other address letter or symbol is read from the punched tape. The decoder 62 has one additional output terminal labeled with the symbol #. As each row of holes passes through the senser 56, the decoder 62 will produce a momentary binary "1" signal on this terminal # only if that row represents one of the ten possible decimal numbers 0 through 9, and does not represent an address code or symbol. A # signal is indicative that the binary signals on the number buses at that instant do in fact represent a decimal number, and have not resulted from the reading of holes in the first four channels which form a part of an address code.

The temporary data storage registers TAXR, TAYR, TBXR and TBYR (FIG. 5*b*) are, in the exemplary embodiment, four-input, serial shifting registers adapted to receive and store multi-digit decimal numbers in binary decimal code. The details of these shifting registers have been omitted from FIG. 5*b* because they may be conventional. Taking the temporary register TAXR as an example, it will be sufficient to understand that the four input lines thereto may be coupled at certain instants to the respective number buses NB when a gate G2 opens, so that the decimal digit signaled on those buses is transferred into the first decade portion of the register. When a new decimal digit is shifted into this first decade portion (at the right), the decimal numbers previously held in the first, second and third decade portions are respectively shifted to the left, and into the second, third, and fourth decade portions. Each decade portion of the register TAXR has four input lines (collectively here shown as a single heavy line) which by their output potentials represent in 1248 binary coded notation the particular decimal digit stored therein. Thus, as here shown, the register TAXR may receive and store a four place decimal number, with each digit value being signaled in 1248 binary decimal code.

In response to an enabling signal RCA on their control terminal, dump gates 64 will transfer in parallel the multidigit number stored in the temporary register TAXR into the associated active register AXR. The output conductors of the active register AXR will thus supply number-representing signals to the interpolation director 40 (FIG. 2) which utilizes such data in the manner generally described above.

Figure 5A:
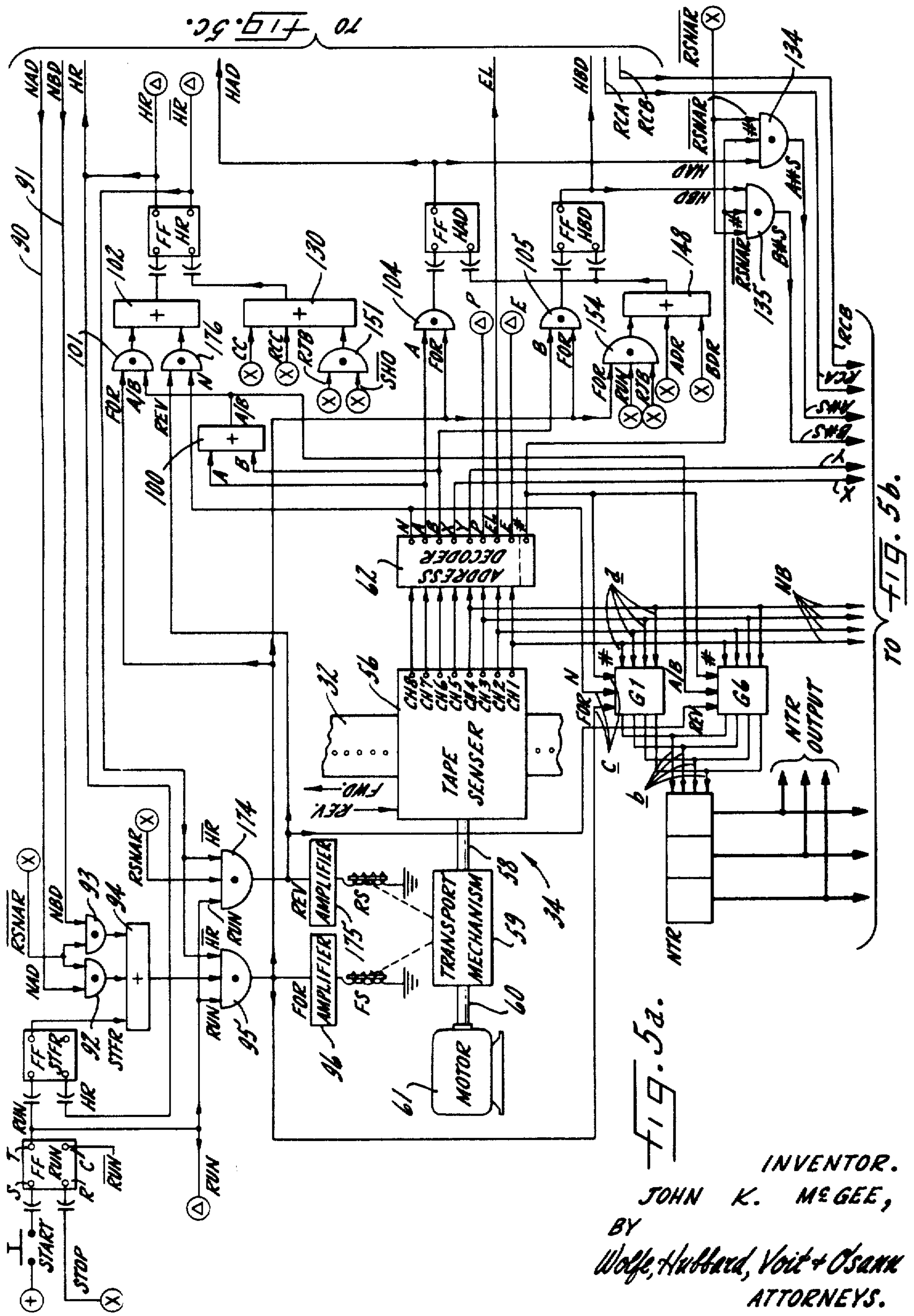

The gates G3, G4, G5 and the temporary registers TAYR, TBXR, TBYR associated with dump gates 65, 66, 67 and active register AYR, BXR, BYR are organized in the same manner noted above for the register TAXR, the gate G2, the dump gates 64, and the active register AXR. As shown in FIGS. 5*a* and *b*, the gates G2 and G3 both have control inputs labeled A#S. The A#S signal will exist (as hereinafter explained) only if the block passing through the tape reader 55 contains A data, and if certain other conditions are satisfied. Moreover, the gates G2 and G3 respectively have control inputs X and Y (connected to the X and Y output terminals of the decoder 62) so that the temporary registers TAXR and TAYR can only receive those numbers which respectively follow X or Y codes in a block of A data. Similarly, the gates G4 and G5 are both controlled by the B#S signal and are respectively controlled by X and Y signals, so that the registers TBXR and TBYR may only have numerical data shifted into them as a result of reading numbers from the tape which respectively follow X and Y codes in blocks of B data. In this way, when A or B data is read from the tape, and if such data is to be transferred into the data processing apparatus because other conditions are satisfied, the X and Y numbers within a block of A data are shifted into the temporary registers TAXR and TAYR; whereas the X and Y numbers within a block of B data are shifted into the temporary registers TBXR and TBYR. Information may be shifted into the temporary registers and made ready for parallel transfer to the corresponding active registers while the director 40 is acting upon sets of numerical information then being held in the active registers.

Figure 5B:
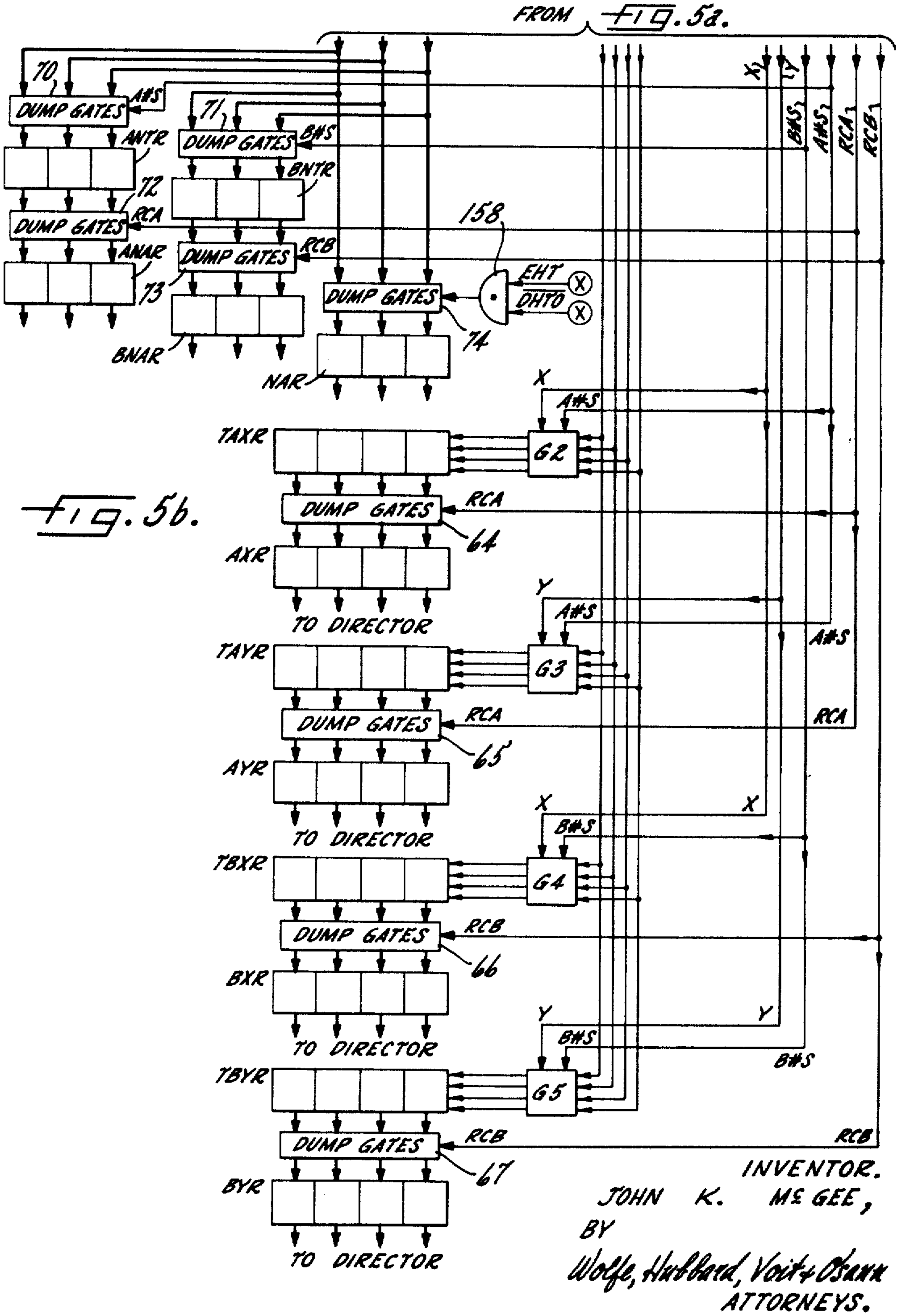

Temporary shift registers and active storage registers to receive and store feed rate numbers which follow F codes have not been shown in FIGS. 5*a* and 5*b*, nor has any means been illustrated for handling sign information (minus signs). However, those skilled in the art will understand that such registers may be arranged and coupled with the director 40 in a manner similar to that described above for the temporary and active X and Y registers which receive A and B data.

In keeping with one aspect of the present invention, provision is made to temporarily store each block number as it is read from the punched tape. As here shown, the number buses NB are connected through the multiple gate G1 (FIG. 5*a*) to the inputs of a temporary shifting type storage register NTR, such gate being opened in response to simultaneous FOR, N and # signals applied to control terminals *c*. Thus, if the punched tape is being transported forwardly (so that the FOR signal is a "1"), and if an N address has been read, the subsequent decimal digits constituting a block number will be shifted into the temporary block number storage register NTR.

The output signals of the register NTR, and thus the decimal numbers designated thereby, may be selectively transferred in parallel into either the A or B block number temporary registers ANTR or BNTR by opening dump gates 70 or 71 (FIG. *5b*) respectively. The conditions under which each type of transfer occurs will be described later. Once the block number for an A or B block has been received in the temporary register ANTR or BNTR, it may be transferred into the A or B active block number register ANAR or BNAR by enabling dump gates 72 or 73, respectively. As will become apparent later, when a block of A data is transferred into the temporary A data registers TAXR, TAYR, the block number for such data is transferred from the register NTR into the temporary block number register ANTR; and when that same block of A data is dumped into the active registers AXR, AYR, the associated block number is also dumped from the temporary block register ANTR into the active block number register ANAR. The same is true for B data and the block numbers therefor, with respect to the temporary and active registers TBXR, TBYR, BXR, BYR, BNTR, and BNAR.

For a purpose to be explained below, any block number (whether it is for a block of A or B data) held in the temporary shift register NTR may optionally be transferred into a special block number storage register NAR by opening dump gates 74. This register NAR remembers and signals the block number for the first previously unused block of data which is rejected or skipped when a particular one of the two types of available data is being "hunted" on the punched tape.

F. *The reader and information transfer controls for handling A and B data*

The organization of the system illustrated in FIGS. *5a–d* may best be described by a narrative of the sequential operations which occur under different conditions. Such sequences will be considered first under conditions where the machine tool and data processor are already in operation, i.e., have begun and partially completed two overall programs of motion for the A and B heads, respectively. Let it be assumed, merely for purposes of discussion that:

(a) The A and B active registers all contain X and Y data, and block numbers corresponding to the stored sets of data, so that the director 40 in response to number-representing signals received from those active registers is causing the A and B heads of the machine tool to execute the commanded increments of motion. In other words, both the A and B heads are assumed initially to be in motion under control of the data in the active registers of the data processor. The blocks of A and B data in active storage may, and probably will, require different time periods for execution, and thus one of the A and B heads will complete its movement commanded by the set of data in active storage before the other head does so.

(b) A and B data has been read from the punched tape and transferred into the temporary registers TAXR, TAYR, TBXR, TBYR, ANTR and BNTR. Therefore, as soon as either the A or B head completes its operations commanded by the A or B data in effective storage, fresh data will be available in the temporary A or B registers for immediate dumping into the active storage registers.

(c) All of the various bistate devices or flip-flops shown in FIGS. *5a–d* are at this time in their reset or "0" states, so that the various "true" signals (those represented by letters having no superimposed bar) are at a binary "0" level, and the various "complement" signals (those represented by letters with a superimposed bar) are at a binary "1" level. As two exceptions, the flip-flop RUN is set and the signal RUN is at a binary "1" level; and the two flip-flops ADR and BDR (FIG. *5c*) are both set so that the signals ADR and BDR are "1's," signifying that A data is ready and B data is ready to be dumped from the temporary A or B registers into the active A or B registers.

With the defined initial conditions set forth above, when either the A or B head completes the execution of the motion increment defined by the set of numerical information held in the A or B active registers, the director 40 will produce and transmit either an AEPC or BEPC signal to a corresponding one of gates 78 and 79 (FIG. *5c*). Thus, because the signals ADR and BDR are both at "1" levels, either the gate 78 or the gate 79 will produce a "1" output signal which causes a time delay device 80 or 81 to create either an RCA or an RCB signal after a short time delay.

When an RCA or an RCB binary "1" signal appears, two responses occur:

(a) The gates 64, 65 and 72 will be opened in response to an RCA signal to dump the bolck of data then contained in the temporary A registers into the active A registers; or the gates 66, 67 and 73 will be opened in response to an RCB signal to dump the set of information then contained in the temporary B registers into the active B registers.

(b) The RCA or RCB signal is fed back to the reset terminal of the flip-flop ADR or BDR via lines 82 or 83, respectively. This resets the corresponding one of the flip-flops ADR or BDR and removes the indication that there is "A data ready" or "B data ready." Because the ADR or BDR signal is thus changed to a "0" level, the gate 78 or 79 is disabled, so that after a short time interval created by the corresponding delay device 80 or 81, the signal RCA or RCB returns to a "0" level.

Since the data in the temporary A or B registers has just been dumped (in response to an AEPC or BEPC signal), that set of temporary registers contains no fresh data. In effect, that set of previously dumped temporary registers is "empty" because the information therein has been transferred into the corresponding active registers. In order to signal that the data processing apparatus needs more A or B data from the punched tape to refill the empty set of temporary registers, and particularly to signal which type of data is needed, two flip-flops NAD and NBD are respectively connected to be set whenever an RCA or an RCB signal appears. As here shown, when the RCA signal changes momentarily to a binary "1," it is routed via a line 84 and through an OR circuit 85 to the set terminal of the flip-flop NAD. Correspondingly, whenever an RCB signal exists momentarily at a binary "1" level, it is routed via a line 86 and through an OR circuit 87 to the set terminal of the flip-flop NBD. Thus, depending upon whether the A or B temporary registers of the data processing apparatus need additional A or B data, the flip-flop NAD or NBD is set, and the corresponding signal NAD or NBD changes to a binary "1." Thus, means are provided to produce a first or second signal (NAD or NBD) whenever the data processing apparatus respectively "needs" additional A or B data for the continued operation of the A or B head.

At this point, therefore, the A or B head is operating on data newly transferred into the corresponding active storage registers, and the A or B temporary registers are in effect empty (although not necessarily cleared). If an AEPC or BEPC signal initiated dumping by creating an RCA or RCB signal, then an NAD or NBD signal respectively exists at a binary "1" level.

In response to either type of "need" signal NAD or NBD, the tape reader 34 is started forwardly so that additional data may be read from the punched tape. As a means of starting the tape reader forwardly under these conditions, the NAD and NBD signals are transmitted via lines 90 and 91 to the inputs of gates 92 and 93 (whose second inputs signals $\overline{\text{RSNAR}}$ are at this time "1"). Thus, irrespective of whether NAD or NBD is a "1," one of the gates 92 or 93 will supply a binary "1" input to an OR circuit 94 and the latter will, in turn, supply a binary "1" signal to one input of an AND gate 95. The other two input signals RUN and $\overline{HR}$ for the gate 91 are at this time binary "1's," so that the output FOR of this gate also becomes a binary "1." Therefore, the solenoid FS is energized through driver amplifier 96 and the tape 32 is advanced forwardly through the tape senser 56.

For a reason which will be made clear below, the tape 32 had previously been stopped with the end of block code EL in the last-accepted block of information alined with the hole-sensing elements. Therefore, as the tape reader 34 is started forwardly, the senser 56 first reads the N code and the three following numerical codes which define the block number for the next block of information on the tape. When the N code is thus sensed, the N terminal of the decoder 62 receives a binary "1." And, as noted above, the FOR signal is now a binary "1." Thus, as each of the three digits of the block number are successively represented by signals appearing on the number buses NB, the gate G1 opens because the # signal momentarily becomes a "1," and the block number for this new block of data is shifted into the register NTR.

After the block number for the new block or data has been stored into the register NTR, the next row appearing on the punched tape will be either an A or B designator indicating whether that block contains A or B data. Thus, either the A or B terminal of the decoder 62 will receive a binary "1" signal.

The A and B terminals of the decoder 62 (FIG. 5*a*) are both connected as inputs to an OR circuit 100 and the output of the latter (which is designated A/B) will thus change to a binary "1" level when either an A or B code is read from the punched tape. The A/B signal forms one input to a gate 101 having as its second input the signal FOR. Since both inputs to this gate 101 momentarily exist at the "1" level, the gate transmits a "1" through an OR circuit 102 to the set terminal of a "hold read" flip-flop HR. Therefore, when the tape is being transported forwardly and either an A or a B code is read, the flip-flop HR will be set, and its complement output signal $\overline{HR}$ will change from "1" to "0." As a result, the AND gate 95 which was previously enabled will be closed, and the signal FOR will revert to "0," so that solenoid FS is denergized and the tape reader 34 is stopped. Setting of the "hold read" flip-flop HR thus stops the reader in a hold mode to allow sufficient time for several comparisons to take place, as treated more fully below. When the flip-flop HR is set, and the forward transport of the tape 32 is terminated, the tape stops with the row of holes representing the A or B code substantially alined with the sensing elements in the tape senser 56.

In order to provide a semi-permanent signal indicative of the type of data contained in the tape block which is part way through the reader, two flip-flops HAD and HBD are arranged to be set when an A or a B code is respectively read while the tape is moving forwardly. As here shown, the A and B terminals of the decoder 62 are respectively connected to inputs of gates 104 and 105, the second input of each such gate being the signal FOR. Thus, prior to setting of the hold read flip-flop HR, and during the instant that the signal FOR is simultaneously a "1," the reading of an A or B code will respectively set the flip-flop HAD or the flip-flop HBD, thereby making the signal HAD a "1," or the signal HBD a "1," and signifying "have A data" or "have B data."

The tape reader is now stopped, or more particularly, it is in a hold mode. There is a need for more data, and the type of data which is needed is indicated by whether the NAD or NBD signal is a "1." Moreover, the tape block which is partly advanced through the tape senser 56 (hereinafter referred to as the "passing block") has resulted in a signal indicative of the type of data it contains, i.e., if the signal HAD or HBD is a "1," that block has A or B data, respectively.

Figure 5C:
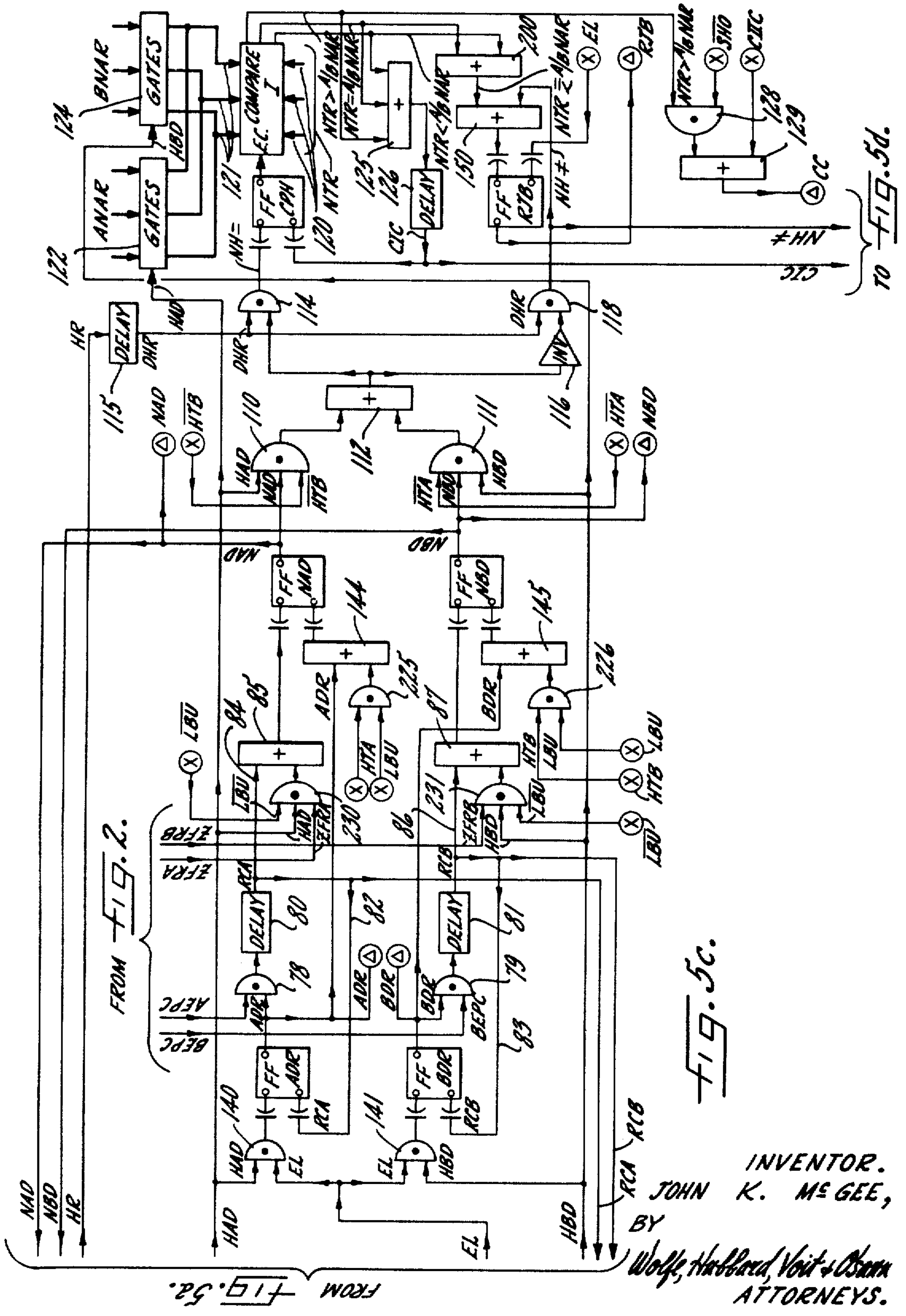

To compare the "need" and the "have," the NAD and HAD signals are applied (as shown in FIG. 5*c*) to two of the inputs of an AND gate 110 (whose third input signal $\overline{HTB}$ may for the moment be assumed to reside at the "1" level); and the NBD and the HBD signals are applied to two of the inputs of an AND gate 111 (whose third input signal $\overline{HTA}$ may be assumed for the moment to reside at the "1" level). If the "need" and the "have" are not equal (if NAD is "1" and HBD is "1," of if NBD is "1" and HAD is "1"), neither of the gates 110, 111 will produce a "1" output. On the other hand, if the need and have are equal (NAD and HAD are both "1," or NBD and HBD are both "1"), then one of these two gates 110, 111 will produce a "1" output signal.

The outputs of the two gates 110 and 111 are supplied as inputs to an OR circuit 112 whose output will thus be a binary "1" only if the "need" and "have" are equal.

The output of the OR circuit 112 is transmitted to two places. First, it is applied as one input to and AND gate 114 whose second input signal DHR rises to a binary "1" a short time after the flip-flop HR sets, the delayed hold read signal DHR being produced by a delay device 115 which receives as its input the HR signal. Thus, if the "need" and "have" are equal (HAD·NAD or HBD·NBD), the gate 114 makes its output signal NH= a binary "1" and this in turn sets a flip-flop CPH so that the latter supplies a binary "1" signal to the enable terminal EC of a COMPARE I device.

Secondly, the output of the OR circuit 112 is transmitted through an inverter 116 to the input of a gate 118 whose second input is the signal DHR. Therefore, if the "need" and the "have" are not equal (HAD·NBD or HBD·NAD), and the output of the OR circuit 112 is a binary "0" at the instant that the delayed signal DHR switches to a binary "1," the gate 118 will make its output signal NH≠ change to a binary "1" level.

In summary, therefore, the type of data needed (A or B) is signaled; the type of data (A or B) appearing in the block which is present in the tape reader is signaled; and the two are compared in a manner such that the signal NH= becomes a "1" if the "need" and the "have" are in agreement, and the signal NH≠ becomes a "1" if the need and the have are in disagreement.

(1) IF "NEED" AND "HAVE" ARE EQUAL

Let it be assumed that the "need" and "have" are equal, so that the flip-flop CPH (FIG. 5*c*) is set when NH= becomes a binary "1." The setting of the flip-flop CPH enables the COMPARE I device here shown in simplified block form, but which functions to compare the relative magnitudes of two three-place decimal numbers represented in binary coded decimal notation by input signals applied thereto. The significance of the function served by the COMPARE I device will be described below, but for the present it will be noted only that this device has three output lines labeled $NTR>A/BNAR$, $NTR=A/BNAR$ and $NTR<A/BNAR$. A first set of input trunks 120 supplies signals from the register NTR representing the block number stored therein. A second set of input trunks 121 supplies signals either from the register ANAR or BNAR representing the block number for A or B data held in active storage, depending upon whether the "have" is A or B data. For this purpose, plural gates 122 and 124 respectively enabled by the HAD or HBD signals are interposed between the output lines of the respective active block number registers ANAR and BNAR, on the one hand, and the input trunks 121 of the COMPARE I device, on the other hand. The three input lines of the compare device all normally reside at a "0" level, but when the "enable compare" terminal EC of the compare device receives an enabling "1" signal from the flip-flop CPH, then one of those output lines will rise to a binary "1" level. In particular, if the block number held in the temporary register NTR is either greater than, equal to, or less than the block number held in the selected one of the two registers ANAR or BNAR, then the COMPARE I output line $NTR>A/BNAR$, the line $NTR=A/BNAR$, or the line $NTR<A/BNAR$ will respectively receive a binary "1" signal.

It will be assumed for the moment that, as a result of the NH= signal setting flip-flop CPH and enabling the COMPARE I device, the signal on the output line $NTR>A/BNAR$ rises to a binary "1" level. This signal is supplied as one input to an OR circuit 125 whose output passes through a delay device 126 to produce a "compare I complete" signal CIC which is applied to the reset terminal of the flip-flop CPH, thereby resetting the latter and disabling the COMPARE I device. The output lines $NTR=A/BNAR$, $NTR<A/BNAR$ are also connected to the inputs of the OR circuit 125 so that the COMPARE I device will be disabled shortly after it produces any response, the response thus existing only for a short time interval determined by the delay device 126.

As a second and primary result of the signal $NTR>A/BNAR$ rising to a "1" level, it causes an AND gate 128 (whose second input signal $\overline{SHO}$ at this time is a binary "1") to produce a "1" output signal which is transmitted through an OR circuit 129 to the terminal CC. As shown in FIG. 5*a*, a "1" signal on the terminal CC is passed through an OR circuit 130 to the reset terminal of the flip-flop HR, so as to reset the latter and thus switch the signal $\overline{HR}$ to a "1."

In the sequence presently being described, the "need" and the "have" are equal, and the block number held in the register NTR (for the passing block) is greater than the block number in the A or B active storage register, if the passing block respectively contains A or B data (HAD is "1," or HBD is "1"). Under these circumstances, the data within that block may properly be accepted and transferred into the data processor. Resetting of the flip-flop HR returns the $\overline{HR}$ signal applied as one input to the gate 95 to a binary "1" so that the signal FOR again becomes a binary "1," the solenoid FS is energized, and the tape reader 34 is restarted in a forward direction.

At this time, however, either the HAD or HBD signal is a "1" so that either a gate 134 or a gate 135 (FIG. 5*a*) is partially enabled, depending upon whether the passing block contains A or B data. It may be assumed that the $\overline{RSNAR}$ signal, also applied as inputs to both of the gates 134 and 135, is at this time a "1." Therefore, as the tape 32 is transported forwardly and each row of the passing block is successively read and signaled, the X and Y output terminals will rise to a binary "1" level as the reading of X or Y data begins, and a # signal will appear as each decimal digit following such an address code is read. Therefore, if the passing block contains A data, the gate 134 will create a A#S signal which will permit the shifting of X and Y data through the gates G2 or G3 into the temporary A head registers TAXR and TAYR. On the other hand, if the passing block contains B data, the gate 135 will create B#S signals which permit X and Y data to pass through the gates G4 and G5 into the temporary B head registers TBXR and TBYR.

It will be recalled that when the first four rows of the passing block were read, the block number therefor was shifted into the register NTR. As soon as the tape reader is restarted in response to resetting of the flip-flop HR after a "hold," the gate 134 or the gate 135 will make the A#S or the B#S rise to a binary "1" level if that block contains A or B data, respectively. In response to the first such A#S signal, the dump gate 70 will be opened so as to transfer the block number previously held in the register NTR into the temporary A block number register ANTR; but on the other hand, the first appearance of the B#S signal will open the dump gate 71 so as to transfer the contents of the register NTR into the block number register BNTR. In this manner, each block number read from the tape is always temporarily shifted into the register NTR regardless of whether that particular block contains A or B data. However, after it has been determined that the block contains A data, and that such A data will be transferred into the temporary A data registers of the data processor, then that same block number will be dumped into the A block number register ANTR. Similarly, if the block in question contains B data, and after it has been determined that such B data will be transferred into the data processor registers, then the block number for that particular block will be dumped from the temporary register NTR into the B data block number temporary register BNTR.

As thus far described, therefore, when the A or B head of the machine tool completes its operation in response to a given block of data held in the corresponding active registers of the data processor, the punched tape reader 34 is started, and if the type of data required by the data processor to keep the A or B head in operation exists in the first block read from the punched tape, the data from that block will be transferred into the data processor. If more A data is needed, and A data appears in the first tape block sensed after the reader is started, then such data will be accepted. Similarly, if more B data is needed and B data exists in the first tape block sensed, such data will be read and accepted by the data processor.

The tape reader 34 when restarted after a "hold" will continue to run forwardly and the various rows in the passing block will be read, converted into address and number signals on the number buses. Those signals will be accepted by the data processor. However, when the end of the passing block is reached and the "end of block" code therein results in the signal EL from the decoder 62 becoming a "1," this latter signal is applied to two gates 140 and 141 (FIG. 5*c*). If the passing block contains A data (indicated by the fact that the HAD signal is then a "1"), the response of the gate 140 will set the flip-flop ADR if the latter has been previously reset. On the other hand, if the passing block contains B data (indicated by the fact that the HBD signal is then a "1") the response of the gate 141 will set the flip-flop BDR if the latter was previously reset. Therefore, if a block of information has been accepted from the tape, in response to a "need" for the type of data which that block contains, then the corresponding one of the flip-flops ADR or BDR will be set when the reading of that particular block is completed, thereby indicating that "A data is ready" or "B data is ready" in the temporary A or B registers.

When the ADR or BDR signal thus switches to a "1" level, it passes through an OR circuit 144 or an OR circuit 145 to reset the flip-flop NAD or NBD, respectively. Therefore, when the EL code of the passing block is read, whichever one of the "need A" or "need B" signals previously existed is restored to a "0" level. This closes the previously opened one of the gates 92 or 93, so that the signal FOR switches to a binary "0," the solenoid FS is deenergized and the tape reader 34 is stopped at the EL code row of that passing block. Thus, once a block of data has been accepted, the tape reader is stopped and remains in readiness to be started again in response to the described sequence of operations which will be repeated when the next AEPC or BEPC signal appears.

Moreover, when the ADR or BDR signal switches to a "1" in response to the reading of an EL code, that signal will pass through an OR circuit 148 (FIG. 5*a*) and be transmitted to the reset terminals of both the flip-flops HAD and HBD. Thus, whenever the EL code row in a block of data which has been accepted is read, that one of the two flip-flops HAD or HBD which was previously set to its "1" state is reset to its "0" state, thereby removing the HAD or HBD signal. The apparatus thus includes means for signaling "have A data" or "have B data" in the passing block, but only while that block is passing through the reader. The entire apparatus is thus restored to its original condition with the tape reader stopped at the end of the previously accepted block of information, with the flip-flop RUN still in its "1" state, and with both of the flip-flops ADR and BDR set in their "1" states.

The sequence of operations described above will occur repeatedly each time that the director signals that more data is needed from the punched tape, assuming that the first block read when the reader starts contains the particular type (A or B) of data which is needed. However, it will happen that the first block (and perhaps several following it) read when the tape reader starts contains data of a type not needed, and the operation of the system under these conditions will next be described.

(2) IF "NEED" AND "HAVE" ARE NOT EQUAL

In accordance with the present invention, provision is made to reject and ignore the data in any block on the punched tape when the "need" and the "have" are not equal. In other words, if a first type of data (A or B) is needed, but a different type of data (B or A, respectively) is contained in a tape block being scanned, the data represented in that block is not transferred into the data processor but, on the contrary, the output signals from the tape reader are prevented from entering the temporary shifting registers. Moreover, the tape reader is caused to continue running forwardly and "hunt" until it reaches the next block, and if necessary, to continue hunting through successive blocks along the tape, until it finds a block containing data of the type needed.

In order to produce this "hunting" action, the first or second signal (NAD or NBD) indicative of the type of data needed are produced as explained above when an RCA or RCB signal results in dumping of A or B data from the temporary into the active storage registers. Moreover, the tape reader 34 is started forwardly in the manner described (because either the NAD or NBD signal becomes a "1"), and it is put into a temporary "hold" when the A or B code of the passing block is read and the flip-flop HR is set. A third or a fourth signal (HAD or HBD) indicative of the type of data (A or B respectively) in the passing block is produced, in the manner set forth above, and the comparing means (gates 110 and 111, OR circuit 112, and gates 114 and 118) then produces a fifth or sixth signal (NH= or NH≠) indicating whether the need and the have are equal or unequal. In the previous section of this specification it was assumed that NH= became a "1" and NH≠ remained a "0." In the present section, it will be assumed that NH= remains "0" (so that CPH is not set and the device COMPARE I is not enabled) but that NH≠ becomes "1," the operation up to this point being the same as that already described.

As a means for causing the tape reader to continue running forwardly, but to prevent the reader output signals from being shifted into the temporary registers, in response to the signal NH≠ becoming a "1," this latter signal is applied from the gate 118 (FIG. 5*c*) to one input of an OR circuit 150 (FIG. 5*c*), and the output of the latter thus sets a reject flip-flop RJB. The signal RJB thus becomes a "1."

As indicated in FIG. 5*a*, the signal RJB is applied to one input of an AND gate 151 (whose other input signal $\overline{\text{SHO}}$ is assumed for the moment to be a "1") so that a "1" is applied to one input of the OR circuit 130 and is thus transmitted through the latter to reset the flip-flop HR (which was previously set when the A or B code in the passing block was read and the reader placed in "hold"). Thus, the signal $\overline{\text{HR}}$ is returned to "1," and the gate 95 makes FOR=1, so the solenoid FS is energized and the reader 34 continues to drive the tape 32 forwardly. As an incident to this, the signal DHR returns to "0," closes gate 118 (FIG. 5*c*) and thus causes the NH≠ signal to return to "0."

The reject signal RJB is also transmitted as one input to a gate 154 (FIG. 5*a*), a second input signal RUN at this time being "1." As soon as the reader is restarted and the FOR signal becomes a "1," the gate 154 is opened, and its output is transmitted through the OR circuit 148 to the reset terminals of the two flip-flops HAD and HBD. Thus, the "have" signal which resulted from the reading of an A or B code in the passing block is removed as a result of the NH≠ signal and the creation of the reject signal RJB. This disables both gates 140 and 141 (FIG. 5*c*) so that when the EL code of a rejected block is read, neither of the flip-flops ADR or BDR is set.

The NH≠ signal is also supplied during its short period of existence as one input to a gate 156 (FIG. 5*d*) whose second input $\overline{\text{LBU}}$ is assumed to be a "1" at this time. The gate 156 therefore produces an output signal EHT, and the latter produces two results. First, signal EHT now being at a "1" level is supplied to one input of a gate 158 (FIG. 5*b*) whose other input signal $\overline{\text{DHTO}}$ is now also a "1" because the flip-flop HTA or HTB has not yet been set and the signal HTO is "0." The output of the gate 158 thus momentarily opens the dump gates 74 and the block number for the passing block stored in the register NTR is transferred in parallel into the storage register NAR. Thus, it will be seen that means are provided to semi-permanently store and signal the identity of the block number for the first block which is to be skipped or rejected when hunting begins.

Secondly, when the EHT signal becomes a "1," it is applied to one input of each of two gates 160 and 161 (FIG. 5*d*) whose second inputs are respectively NAD and NBD. Therefore, depending upon whether the data processing apparatus needs additional A data or additional B data, i.e., whether NAD or NBD is a "1," the gate 160 or the gate 161 will produce a "1" signal to set the flip-flop HTA or the flip-flop HTB, respectively, to its "1" state. The flip-flops HTA and HTB serve to indicate that because the passing block of data is being rejected, the system is now "hunting" for A data or B data because there is a "need" for A data or B data, respectively.

In response to the setting of either one of the flip-flops HTA or HTB, a "1" signal will be applied to an OR circuit 165, and an output signal HTO from the latter will thus change to the "1" level. Moreover, that latter signal in passing through an inverter 166 to produce the signal $\overline{\text{HTO}}$, will change the $\overline{\text{HTO}}$ signal from a "1" level to a "0" level. When the HTO signal is a "1" (and the $\overline{\text{HTO}}$ signal is a "0"), this is indicative of the fact that the system is in a hunting mode. Shortly after the $\overline{\text{HTO}}$ signal switches to "0" as hunting begins, a delay device 162 receiving that signal as an input produces a delayed signal $\overline{\text{DHTO}}$ which is supplied as one input to the gate 158 (FIG. 5*b*). The delay between the instants at which signals $\overline{\text{HTO}}$ and $\overline{\text{DHTO}}$ become "0" provides time for the gate 158 to open in response to the signal EHT before that gate is closed for the duration of the hunt mode.

Summarized, when the "need" and the "have" of a block passing through the reader do not agree, and the signal NH≠ becomes a "1," the following transpires:

(a) The reject flip-flop RJB is set.

(b) The flip-flop HR is reset, so that the "hold" is terminated and the tape is driven forwardly.

(c) The block number for the passing block is dumped from the register NTR into the register NAR.

(d) The "have" signal is destroyed, because the reject signal RJB resets whichever one of the two flip-flops HAD and HBD which was previously set.

(e) The flip-flop HTA or the flip-flop HTB is set if there is a need for A or B data, respectively, to indicate that the apparatus is hunting for A or B data but thus far has found B or A data.

(f) The HTO and $\overline{\text{HTO}}$ signals become "1" and "0," respectively, indicating that the hunt mode exists, and thereafter the signal $\overline{\text{DHTO}}$ becomes "0."

Because neither the HAD or HBD signal is a "1," the two gates 134 and 135 (FIG. 5*a*) are both disabled. Therefore, as the tape moves forwardly and the successive rows of the passing block are converted into reader output signals, neither the A#S or B#S signal can become a "1," so all of the gates G2, G3, G4 and G5 remain closed. In this way, the data read from the passing block is inhibited or prevented from being transferred into the temporary storage registers of the data processor. The data of the passing block is read, but the reader signals corresponding to such data are simply ignored or "rejected."

When the "end of block" code for the first rejected block is read, however, and the signal EL momentarily becomes "1," such signal cannot set the flip-flop ADR or the flip-flop BDR because neither of the signals HAD or HBD is a "1" and the gates 140 and 141 are disabled. (It will be recalled that either the flip-flop ADR or BDR is in the reset state depending upon whether a need for A or B data first initiated operation of the tape reader.) Therefore, the flip-flop NAD or NBD (whichever one was previously set) is not reset in response to the EL signal becoming a "1" (as contrasted to the operation described above when the "need" and "have" are equal), and the FOR signal continues at the "1" level. Thus, the tape reader is not stopped, but on the contrary it continues to move the tape forwardly so the initial code rows of the succeeding block are read.

The EL signal is coupled directly to the reset terminal of the reject flip-flop RJB (FIG. 5*c*) so that as the "end-of-block" code of a rejected block is read, that flip-flop is reset. This by itself produces no effect, but it restores the system to a condition for comparing the existing "need" with the next "have" which will be signaled as a result of reading the next block of data.

As the tape reader continues to run forwardly, it will read the block number (N*xxx*) from the next block and such number will be shifted into the temporary register NTR, as previously described. The A or B code of such block will then be read, causing the flip-flop HR to be set so that the reader is stopped in a "hold" mode, and causing one of the flip-flops HAD or HBD (depending upon whether that block contains A or B data) to be set through gate 104 or 105. With the reader in a "hold" mode, the need-have comparison will now occur again, and will result in either the NH= or NH≠ signal becoming a "1." For the sake of explanation, it will be assumed that the presently passing block contains A data (and that the flip-flop HAD is set at about the instant the "hold" begins), but that there is a need for B data (so that the flip-flop BDR is reset and the flip-flop NBD is set). This means that the system is searching for B data, and thus that the signals HTB and HTO are both "1."

It may be observed that because HTB is "1" and $\overline{HTB}$ is "0," the gate 110 is disabled, and cannot produce a "1" output. Therefore, until HBD and NBD signals simultaneously become "1," the "need-have" comparing means cannot produce a NH= signal, but must produce a NH≠ signal at the output of gate 118 while the flip-flop HR is set and the signal DHR is a "1."

Thus, under the conditions here assumed, the second block (containing A data) now passing through the reader results in the NH≠ signal becoming a "1," and the reject flip-flop RJB is again set in the manner previously described. The flip-flop HR is reset by the resulting signal RJB passing through gate 151 and OR circuit 130, so that the reader is restarted forwardly; and the flip-flop HAD is reset, so that both the gates 134 and 135 are disabled. The A data read from this passing block is thus rejected and ignored because there is a need for B data.

Because the flip-flop HTB is set, and the signal $\overline{DHTO}$ is "0" when the NH≠ signal makes the signal EHT momentarily "1," the gate 158 (FIG. 5*b*) is not enabled, and there is no dumping of the contents of register NTR into the register NAR. Thus, the latter register continues to store the block number for the first rejected block, even though a second block is now being read and rejected.

When the EL signal is produced by the reader from the second rejected block, the flip-flop RJB is reset but the reader continues to run forwardly, as previously explained for the first block. Thus, the sequence of operations herein described will repeat over and over—the tape being transported forwardly through successive blocks so long as there is a need for B data but the blocks contain A data (or vice versa). It is quite possible that when huntng for A or B data begins, the next 3 or 5 or 10 (or any number) blocks encountered on the tape will contain B or A data respectively—and the system here described will function to cause continued forward drive of the tape and rejection of the tape data so long as the "needed" type of data is not found.

(3) WHEN THE HUNT IS SUCCESSFUL; ACCEPTING THE NEEDED TYPE OF DATA

In accordance with the invention, the system includes means to terminate the hunting and to accept data read from a block which contain the type needed. To pursue the conditions stated for purposes of discussion under the last heading, let it be assumed that the one or more blocks of data have been read from the punched tape but rejected, and in particular that there is a nede for B data ($NBD=1$ and $BDR=0$, $HTB=1$ and $HTO=1$) but only A data blocks have been found. When the reader reaches the EL code at the end of the last such rejected block, it does not stop, but the flip-flop RJB is reset. Suppose now the next block on the tape contains B data. The reader will signal the block number N*xxx* for this passing block and this number will be stored in the register NTR. The decoder 62 will then produce a $B=1$ signal and thus will stop the reader in a hold mode when the flip-flop HR is set. The flip-flop HBD will be set as the hold begins.

Because the signals HBD, $\overline{HTA}$ and NBD are all "1," the gate 111 will produce a "1" output, and when the signal DHR appears (shortly after HR is set), the flip-flop CPH will be set by a NH= signal to enable the COMPARE I device; and the NH≠ signal will remain a "0" so flip-flop RJB is not set. It will be assumed for the moment that the COMPARE I device then produces a momentary "1" signal on its *NTR>A/B NAR* output conductor (other possible responses will be discussed below). Such "1" signal enables the gate 128 (whose second input $\overline{SHO}$ is assumed to be a "1"), so that a momentary "1" signal appears on terminal CC, passes through the OR circuit 130 (FIG. 5*a*) and resets the flip-flop HR. Because signal $\overline{HR}$ now becomes "1," the "hold" is removed, and the tape reader is restarted forwardly, producing output signals corresponding to each row of indicia in the passing block.

Since the signal HBD is now "1," the gate 135 produces a "1" output each time that a # signal appears from the decoder 62, and in the manner explained above, the X and Y data from the passing block will be accepted and shifted into the temporary registers TBXR and TBYR. The first such "1" value of the B#S signal opens dump gates 71 so that the block number of the passing block is transferred from register NTR into register BNAR.

When the EL code from the passing block is read and after the B data therein has been shifted into the B temporary registers, the EL signal from the decoder will result in a "1" output from the gate 141 (because HBD is a "1"), thereby setting the flip-flop BDR. In the way previously described, the BDR signal becomes "1" and passes through OR circuit 145 to reset flip-flop NBD, so that the signal NBD switches to "0" to disable gate 93 and cause the FOR signal to become "0." Thus the tape reader stops on the EL line of the passing block whose data has just been accepted. Moreover, the BDR signal acting through the OR circuit 148 resets the flip-flop HBD.

Operations similar to those just described transpire in the case where there is hunting for A data, and after one or more B data blocks has been rejected, an A data block is found. In this case, however, the flip-flops ADR, NAD, HTA and HAD come into play, rather than the flip-flops BDR, NBD, HTB and HBD.

(4) REVERSE SEARCHING TO RETURN TAPE TO FIRST UNUSED BLOCK

After the needed type of data has been hunted, found and accepted, and the tape reader stopped as described above, at least one and perhaps many blocks on the tape will have passed forwardly through the reader with their data being rejected. Yet, it is desirable that the reader be conditioned so that it is ready immediately to sense and signal the first unused block on the tape, which contains data of the type ignored during the hunting, when the next "need" for that type of data is signaled. In accordance with the invention provision is made to transport the tape reversely through the reader in response to the termination of a hunting operation, and until the first rejected and previously unaccepted block of the tape is located in the reader.

As a first part of such tape returning apparatus, means are employed to store and signal the block number for the first block of data which is rejected when a hunting sequence of operations occurs because a signaled "need" and a "have" are not in agreement. For this purpose, and as already partly described, such means take the form of the special block number register NAR associated with the dump gates 74 (FIG. 5*b*) controlled by the AND gate 158 so that a block number temporarily held in the register NTR will be transferred only when the signals EHT and $\overline{DHTO}$ are both "1." It will be recalled that when the signal NH≠ becomes a "1" (indicating that the need and the have of a passing block are not equal), the gate 156 (FIG. 5*d*) makes $EHT=1$, to set one of the flip-flops HTA or HTB by means of AND gate 160 or AND gate 161, so that after a short delay the signal $\overline{DHTO}$ derived from delay unit 162 switches from "1" to "0."

Once one of the flip-flops HTA or HTB is set, and the signal $\overline{DHTO}$ becomes "0," the dump gates 74 cannot be opened until that particular hunting sequence is terminated (and the flip-flop HTA or HTB is reset in a manner to be described), even though several more blocks on the tape may result in the NH≠ and EHT signals becoming momentarily "1" as hunting proceeds. Thus, when the tape reader is started forwardly in response to a "need" signal, the first block of data which is rejected due to disagreement of the "need" and "have" causes its block number to be shifted into the NTR register, and that block number is transferred from there into the register NAR when the NH≠ signal, and the EHT signal in turn, both become "1's." Thereafter, the register NAR continues to hold the block number for the first block rejected even though successive blocks are sensed and either rejected or accepted.

As a second part of the tape returning apparatus, means are utilized to cause the tape reader to transport the tape reversely in response to the completed reading of a block which is accepted after hunting has occurred. It will be recalled from the previous section that when a block of data is accepted after hunting, the EL signal produced by the last row of indicia for that block causes the gate 140 or 141 to set flip-flop ADR or BDR (whichever one was previously reset as a result of the data processor needing more A or B data), and this in turn causes resetting of flip-flop NAD or NBD (whichever one was previously set) so that FOR signal becomes "0" and the solenoid FS is deenergized to stop the tape reader. However, the setting of the flip-flop ADR or BDR at the conclusion of hunting for A or B data, respectively, so that the signal ADR or BDR becomes "1," enables a gate 170 or 171 (FIG. 5*d*) whose second inputs are the signals HTA and HTB. Therefore, if A data is being sought ($HTA=1$) and after it is found and accepted, the switching of the signal ADR to "1" causes the gate 170 to produce a "1" output which is transferred through an OR circuit 172 to set a flip-flop RSNAR. On the other hand, if B data is being sought ($HTB=1$) and after it is found and accepted, the switching of the signal BDR to a "1" causes the gate 171 to produce a "1" output and thus set the flip-flop RSNAR, making the signals $RSNAR=1$ and $\overline{RSNAR}=0$. The flip-flop RSNAR is thus always set after a hunting operation has been successful, i.e., the "needed" type of data has been found and accepted.

Referring to the upper left corner of FIG. 5*a*, the signal RSNAR is coupled as one input to a gate 174, whose other two input signals RUN and $\overline{HR}$ are at this time both "1." Therefore, the output signal REV of the gate 174 becomes "1" and causes a driver amplifier 175 to energize the reverse solenoid RS. Thus, the tape reader 34 is started reversely and the tape is reversely transported.

Data signals, produced by the reader when the latter is operating in a reverse mode, are blocked against transfer into the data processor registers. When the reader is running reversely, the signal $\overline{RSNAR}$ is a "0," so the gates 134 and 135 are closed and the signals A#S and B#S cannot become "1." Thus, the gates G2, G3, G4, G5 remain closed when the reader 34 is running reversely. Moreover, even though A or B responses may be produced by the decoder 62 as the tape is moving reversely, these cannot set the flip-flops HAD or HBD because the associated gates 104 and 105 are disabled due to the fact that the FOR signal is a "0." Therefore, neither of the signals HAD or HBD can become "1" when the reader 34 is running reversely.

Nevertheless, as each block of the tape passes reversely through the tape senser 56, the block number therefor is read and temporarily stored, although the individual digits will be received in reveresed order. Such reading and storage of block numbers will now be explained.

Recalling that the tape is moving through the senser in a reverse direction, the first row of indicia read from each passing block will be the EL code, followed by Y, X, and F data numbers and addresses. Then the code A or B will be read, the three digits of the block number will be read, and finally the N address code will be read (see FIG. 3). Thus, as each block passes reversely through the reader, the output signals for the last five code rows to pass (the first five rows of the block, as shown in FIG. 3) will result in the sequential reader output signals of A or B, *x*, *x*, *x*, N. The block number digits will be read in the order of units, tens, hundreds (rather than hundreds, tens, units as in the case of forward tape travel).

When the A or B code is thus read from each reversely passing block, either the signal A or B from the decoder 62 will become a "1," and will so remain until the N code code is read. Therefore, the output signal A/B of the OR circuit 100 will become a "1" and will so remain until the N code is read. This A/B signal is supplied as one control input to a multiple gate G6, whose other control inputs are the REV and # signals. Since when the tape is moving reversely, the REV signal is "1," and because the A/B signal is a "1" during the interval between the reading of A or B and N from each block, the gate G6 will open each time the # signal becomes a "1," thereby transferring each successively read block number digit signaled on the number buses NB into the NTR shifting register. If the true block number is 036, it will then appear in that register as 630. Of course, as a plurality of tape blocks are moved in succession through the reader, shifting of a new block number into the NTR register will simply destroy the storage of the previous block number.

When each N code is read in the reverse mode, it causes the reader to stop in a "hold" mode. As shown in FIG. 5*a*, the N output signal from the decoder 62 is applied to a gate 176 whose other input REV is a "1" only when the reader 34 is running reversely. Thus, when the N code row of a reversely passing block is sensed, the output of the gate 176 becomes "1," passes through the OR circuit 102, and sets the "hold" flip-flop HR. Since the signal $\overline{HR}$ applied as one input to the gate 174 thus becomes "0," the REV signal becomes "0" and the reader stops in a hold mode. This holding provides adequate time for the block number comparison next to be described.

When the "reverse search" is in progress and the block number for the passing block has been stored (with reversed order of digits) in the register NTR, and the reader stopped in the hold mode with flip-flop HR set—then the two input signals RSNAR and HR for a gate 180 (FIG. 5*d*) will both be "1," and the output of such gate applied to the terminal EC of a COMPARE III device will enable the latter. The COMPARE III device is one which operates to compare two three-place decimal numbers represented by binary coded signals applied to its two sets of input terminals. As here shown, the block number (of the first block rejected) held in and signaled by the register NAR is applied to one set of input terminals. The block number (of the reversely passing block) held in and signaled by the register NTR is applied to the second set of input terminals, but with reversed order of the decimal digits. That is, if the true block number in the register NTR is 036, it is stored in that register as 630 (reading from left to right the decade portions of the register). But due to the crossed-connection shown in FIG. 5*d* for the inputs to the COMPARE III device, the number 036 is suppled to the second set of input terminals. In this way, the COMPARE III device may compare each digit of one block number (from NAR) with the corresponding order digit of another block number (from NTR) even though the latter is stored with reversed order of its digits.

The COMPARE III device is a comparator which may take a variety of forms well known in the art. It has two input lines $NAR \neq NTR$ and $NAR = NTR$, and functions to signal, by a "1" appearing on the first or second output line, that the block number in register NAR is either unequal to or equal to the block number held in register NTR. Thus, as the tape is transported reversely, each block will be stopped or held at its N code row, and there will be an indication from the COMPARE III device as to whether the number for that block is equal or unequal to the block number of the first block rejected when a previous hunting operation began.

Assume first that the two compared block numbers are not equal, and that the signal $NAR \neq NTR$ becomes a "1" when the COMPARE III device is enabled. That signal passes through an OR circuit 181 to a terminal RCC, and is thus transmitted to one input of the OR circuit 130 (FIG. 5*a*), so that the flip-flop HR is rest. Thus, the input signal HR to the gate 180 (FIG. 5*d*) switches to a "0" and the COMPARE III device is disabled. Moreover, the signal $\overline{HR}$ to gate 174 becomes "1," the signal REV becomes "1," and the reader resumes its operation in a reverse direction. The same sequence of operations described above repeat over and over, i.e., the block number for the next block will be stored in register NTR, the flip-flop HR will again be set to "hold" the reader, and the COMPARE III device will be enabled, as each block on the tape is passed reversely through the reader while the system is "reverse searchng." After each "hold," the reader will resume reverse transport of the tape if the COMPARE III device indicates, by making the signal $NAR \neq NTR$ a "1," that the block number stored in register NAR is not equal to that of the reversely passing block.

In this fashion, the tape will be moved reversely through successive blocks, so long as the block number of the passing block is not equal to that stored in the register NAR.

Assume now, however, that after reversely searching through one or more blocks of the tape, the COMPARE III device produces a "1" on its $NAR = NTR$ output line. Such signal will pass through the OR circuit 181 to the terminal RCC and therefore will reset flip-flop HR and the output of the latter will close the gate 180 to disable the COMPARE III device. But such $NAR = NTR$ signal also is coupled to reset the flip-flop RSNAR. Thus, when the signal $\overline{HR}$ applied to the gate 174 (FIG. 5*a*) returns to a "1," the signal RSNAR applied to that same gate returns to "0," so the gate remains closed. Therefore, the REV signal remains "0," and the tape reader is not restarted in a reverse direction.

This means that when reverse searching is in progress, the tape is returned to the beginning of the first block previously rejected, and then stopped. The stopping occurs in response to an equal comparison of the block number held in register NAR with that of the passing block held in register NTR.

The tape reader is now at rest, the signal $\overline{RSNAR}$ is "1," and when that signal reverted to "1" it reset the flip-flop HTA or HTB, whichever one was set, to terminate the hunt mode. The apparatus is ready to function again in response to the next AEPC or BEPC signal from the data processor indicating that more A or B data is required from the tape. Of course, if an AEPC or BEPC signal has occurred while the system is hunting for B or A data, or during the reverse searching which follows such hunting, then the signal NAD or NBD will be a "1" at the instant the reverse search is completed, and the tape reader will immediately restart in a forward direction when the signal $\overline{RSNAR}$ reverts to "1" and enables the gates 92 and 93.

(5) SKIPPING BLOCKS FROM WHICH DATA HAS ALREADY BEEN ACCEPTED

It has now been explained how the control system of FIGS. 5*a–d* will start the record reader whenever the data processing apparatus requires additional A or B data, and stop it when such data has been located and accepted. When A or B data is needed but B or A data is found in a block passing through the reader, the data for that block is rejected, and the tape drive continues forwardly in an operation of "hunting" for the needed type of data. After hunting, finding, and accepting the needed type of data, the system actuates the tape reader in a reverse sense, and the tape is returned to the beginning of the first block previously rejected, by a "reverse search" operation in which the tape is reversely driven until a comparison of the block number for each passing block with the stored block number (in register NAR) for the first rejected block results in identity.

Consider the case where the tape reader is stopped (say with the tape disposed in the reader at the end of block N005 shown in FIG. 4) and both the A and B temporary registers contain fresh information ready for dumping into the active registers. Assume that the data processor now calls for additional A data, the contents of the A temporary registers are dumped into the A active registers, and the tape reader is started forwardly because there is a need to supply A data into the now "empty" temporary A registers, But suppose the next four blocks (N006 through N009 in FIG. 4) encountered on the tape contain B data. The system will "hunt" and reject all of such B data blocks as the tape continues to be driven forwardly. Assuming that the fifth block sensed on the tape (block N010, FIG. 4) contains A data, it will be read and accepted, and the tape then transported reversely to the beginning of the first block (N006, FIG. 4) previously rejected.

Suppose now that the data processor again calls for additional A data. The tape reader will be started forwardly, and will reject the four blocks (N006 through N009, FIG. 4) of B data in the manner described. It will then encounter the fifth block (N010) of A data—which was read and accepted at the conclusion of the previous hunt. If that block (N010) of data were read and accepted, the A head of the machine tool would erroneously execute the command which it represents twice. The system thus should ignore this previously accepted block of A data, and continue hunting until it locates a block of A data which has not been previously accepted.

According to one feature of the present invention, the system hunts through the tape to find the needed type of data (A or B) and rejects blocks of any other type (B or A, respectively); but upon locating a data block of the needed type (A or B, respectively), it determines whether or not that block has been previously read and accepted. If so, such block is skipped and rejected, even though it contains the "need" type of data. If not, such block is read and accepted.

This important and advantageous result is achieved by means which include as a principal component the COMPARE I device which has already been mentioned above. The remainder of such means, and the sequential operation which occurs in skipping a previously accepted block will now be treated.

First, it should be recalled that when the data processor requires additional A (or B) data, an AEPC (or BEPC) signal creates an RCA (or RCB) signal to cause dumping of the A (or B) temporary register contents into the A (or B) active registers. Thus, the block number of the last A (or B) data block accepted from the punched tape is stored in the register ANAR (or BNAR). The flip-flops ADR and NAD (or BDR and NBD) are respectively reset and set.

Now, when the tape reader is, in the manner already described, started forwardly because the NAD (or NBD) signal becomes a "1," the "need-have" comparison discussed above will take place as each block passes through the tape senser 56. If the NH≠ signal becomes "1" (indicating that A or B data is needed but the passing block contains B or A data), then the flip-flop RJB is set and the data in that block is rejected; moreover the signal NH= remains "0," so the COMPARE I device is not enabled, as explained above.

On the other hand, if the "need-have" comparison makes the signal NH= momentarily "1" (and the NH≠ signal remains "0"), then the flip-flop CPH is set, and supplies an enabling "1" signal to the "enable compare" terminal EC of the COMPARE I device. This happens whenever there is a need for A or B data and the passing block contains A or B data, respectively.

When so enabled, the COMPARE I device functions to compare the block number of the passing block, held in the register NTR, with the block number held in either the active register ANAR or BNAR—depending upon whether the passing block contains A or B data. That is, and as shown in the upper right corner of FIG. 5*c*, the input trunks 121 of the COMPARE I receive the number-representing output signals from the register ANAR or BNAR through the gates 122 or 124, one of which is opened by the HAD or HBD signal.

The COMPARE I device may take any of several specific forms which are per se well known in the art, and it serves as a means to compare two numbers represented by signals on its two sets of input trunks 120 and 121. Its three output lines (*NTR<A/BNAR,*

*NTR=A/BNAR*

*NTR>A/BNAR*) all receive "0" signals when the device is disabled, but each time the device is enabled, one of those lines will receive a "1" signal depending respectively upon whether the block number in the NTR register is less than, equal to, or greater than the block number held in the selected one of the registers ANAR or BNAR.

All three output lines of the COMPARE I device are connected to inputs of the OR circuit 125, so that each time the device is enabled, the delay device will create a "compare I complete" signal CIC, which, in turn, will reset the flip-flop CPH and remove the enabling signal on the terminal EC. Thus, the response of the COMPARE I device is only momentary, lasting, for example, only a few microseconds.

To cause the passing block to be skipped and its data ignored (even though it contains data of the type needed) if that block has been previously accepted into the data processor, a signal is created indicative of the fact that the block number of the passing block is either less than or equal to the block number then in active storage. For this purpose the COMPARE I output lines

*NTR<A/BNAR* and *NTR=A/BNAR* are connected to inputs of an OR circuit 200 which thus produces a signal *NTR≦A/BNAR* when such fact obtains. The latter signal when it becomes "1" passes through the OR circuit 150 to set the reject flip-flop RJB. When this transpires, the flip-flop HR is in its set state and the reader 34 is in a "hold" mode; as previously explained. The response to the setting of flip-flop RJB is the same as that previously described, i.e., the reader is restarted by resetting flip-flop HR (by signal RJB acting through gate 151 and OR circuit 130) and the data signals from the passing block are inhibited from entry into the temporary registers of the data processor (because the signal RJB passes through the enabled gate 154 and OR circuit 148 to reset HAD or HBD, assuring that gates 134 and 135 are disabled). When the EL code of the passing block is read, the tape reader does not stop, but the flip-flop RJB is reset, and the system therefore begins its "need-have" and its block number comparison for the next block on the tape.

It will be observed that because the NH≠ remains at "0" when a block is skipped, the gate 156 remains disabled, and so the EHT signal remains "0," and neither of the flip-flops HTA or HTB is set when flip-flop RJB is set in response to a *NTR≦A/BNAR* signal. Thus, the block number for a previously accepted data block is never stored in the register NAR because the gate 158 (FIG. 5*b*) is not opened in the absence of the EHT signal becoming "1." This means that when reverse searching takes place after a hunting operation, the tape is returned to the beginning of the first rejected and previously unused block of data, but not to the beginning of a previously accepted block which is skipped due to the action of the COMPARE I device.

Because the block numbers appear on the punched tape in sequence, the fact that the number in register NTR is less than or equal to the block number in the appropriate one of the active registers ANAR or BNAR indicates that the passing block has already been transferred into the data processor. Thus, the response when the signal *NTR≦A/BNAR* becomes a "1" properly causes the data of the passing block to be rejected and ignored.

On the other hand, when the block number of the passing block, held in NTR, is greater than the block number held in the appropriate one of the active registers ANAR or BNAR, this indicates that data of the passing block has not been previously accepted. Under these circumstances, the signal *NTR>A/BNAR* becomes "1," produces a "1" response from the AND gate 128 (whose other input signal $\overline{SHO}$ as shown in FIG. 5*c* is assumed for the moment to be "1"), and thus causes the OR circuit 129 to make the CC signal a "1." As previously described, the latter signal through OR circuit 130 (FIG. 5*a*) resets flip-flop HR, terminates the "hold" on the tape reader so that the tape continues forwardly, and results in the data from the passing block being shifted into the appropriate set of temporary storage registers. The data of the passing block is thus accepted only if (a) it is the type of data "needed," and (b) it has not been previously accepted.

This operation of skipping a previously accepted block occurs irrespective of whether or not the system has been placed in the "hunt" mode. In other words, if the reader is started and immediately finds a block containing data of the type "needed," it will skip and reject that block if the data thereof has already been accepted—and without initiating the hunt mode or causing the block number of such block to be transferred into the register NAR. If hunting is initiated because the next block contains data of a type not needed, the tape will be returned, after hunting, to the beginning of that next block, and not to the beginning of the skipped block. On the other hand, once the apparatus is in the hunt mode (HTA or HTB being set), then any previously accepted block containing data of the type needed will be skipped and the hunt continued. Because of this feature, the system after hunting does not return the tape reversely to the first block of data which is ignored, but it returns the tape to the first rejected block containing data other than the type which was being hunted.

G. *Stopping the operation of the system*

When the programs of motion for the A and B heads have fully executed, the operation of the system will be stopped in response to the reading of an E code. But there are other situations in which the operation may be stopped at intermediate points in the overall programs. For example, the programmer may designate that the cutter for one of the heads must be changed at a certain point before the subsequent machining steps of the program can take place. This calls for a mandatory stop when that point along the punched tape is reached, and such stopping occurs in response to the reading of an E code, as noted below.

Moreover, the programmer may cause P codes to appear at various locations along the punched tape, providing for convenient optional stopping points where the operator may wish to measure the workpiece, tighten the workchuck, or perform other optional duties. If, and only if, the operator elects to cause stopping at the next such optional point, and depresses an "enable planned stop" switch, the system will stop when the next P code is read from the tape.

Still further, the present system affords the operator of the numerically controlled machine the opportunity to stop system operation when any block number, selected by the operator, is reached on the tape. The operator need only adjust a set of dials to represent such block number, depress an enabling switch, and the system will stop when the selected block is reached on the tape.

After these "stops," and the performance of any tool changing, work measuring, or similar desired function, the system will be restarted simply in response to the operator depressing a start switch.

The apparatus which hunts and finds the needed type of data cooperates with the various means for stopping the director and thus as an introduction to such cooperation, the devices and operation which produce different modes of stopping will first be described.

(1) MANDATORY STOPPING IN RESPONSE TO AN E CODE

Figure 5D:
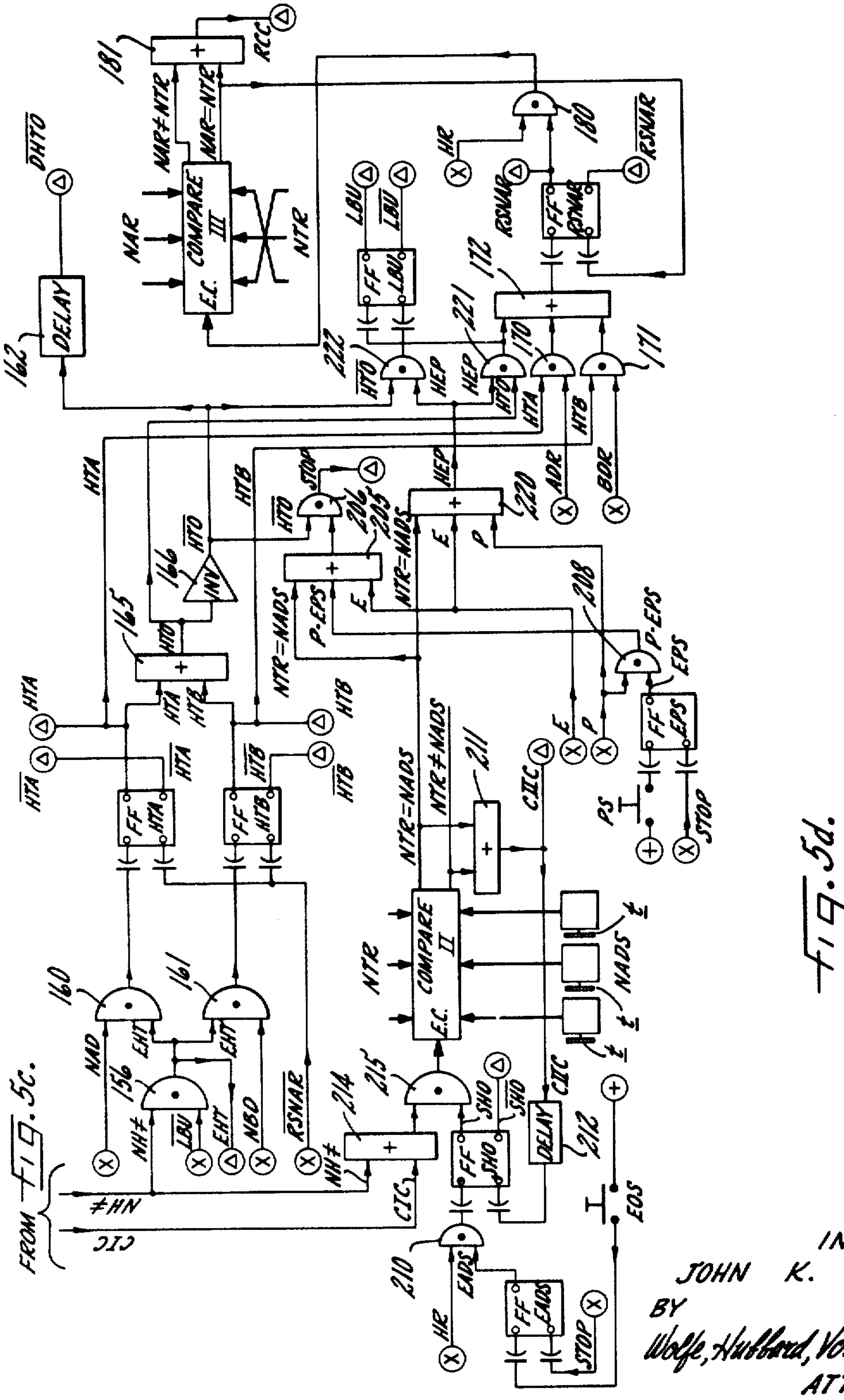

Regardless of when it occurs, the reading of an E code row on the punched tape will produce a "1" signal on the E output terminal of the decoder 62, such terminal being connected as shown in FIG. 5*d* to one input of an OR circuit 205. The resulting "1" output of circuit 205 will pass through a gate 206 to make a STOP signal "1" only if the other input signal $\overline{HTO}$ for such gate is "1." Thus, the STOP signal will appear if an E code is read when the system is not in a hunt mode.

The "1" STOP signal is coupled back to the reset terminal of the RUN flip-flop (upper left corner, FIG. 5*a*), and thus switches the RUN signal to "0," disabling the gates 95 and 174 so that neither solenoid FS or RS can be energized. Thus, the tape reader is prevented from operating when the next "need" signal NAD or NBD appears. The A and B heads will execute the commands defined by the blocks of data in active storage, will then execute the commands represented by the blocks of data in temporary storage (after such data has been dumped into active storage), and will then remain stationary. The system thus stops. The E code will normally appear subsequent to the EL code row of a block on the tape, and the system will stop when the command represented by data in that block, and all preceding blocks, has been executed.

(2) OPERATOR'S OPTIONAL STOP IN RESPONSE TO A P CODE

If the operator elects to have the system stop when the next P code on the tape is reached, he momentarily depresses an enabling switch PS (FIG. 5*d*) which thus transmits a signal to set a flip-flop EPS. This "enables a planned stop." When a P code is next read from the punched tape, and the signal P momentarily becomes "1," but only if the signal EPS is a "1," an AND gate 208 produces a signal $P \cdot EPS$ which is transmitted to one input of the OR circuit 205. If the system is not in the hunt mode, so $\overline{HTO}$ is "1," then the gate 206 makes the STOP signal "1," and this resets the RUN flip-flop (FIG. 5*a*) to stop the system in the manner previously described. The STOP signal also resets the enabling flip-flop EPS.

(3) OPERATOR'S SELECTED STOP

If the operator wishes to stop the system at any particular block on the punched tape, he may electrically represent the block number therefor by "dialing" the three digits on a selector switch bank NADS (FIG. 5*d*). That bank includes three decade portions, each having a thumbwheel *t* indexable to any one of ten number-representing positions 0–9, and connected to actuate internal switches (not shown) so that the latter produce four output signals which represent the corresponding decimal value in 1248 binary code. The output trunks of the switch bank NADS in this manner are caused to signal any desired signal three digit decimal block number. Such "dial-in" switch banks are well known, per se, and will not be described in further detail.

After dialing in his selected block number to signal the point at which he desires stopping, the operator will momentarily depress an enabling switch EOS (FIG. 5*d*) arranged to supply a setting signal to a flip-flop EADS. When thus set, so that the flip-flop output signal EADS is a "1," the apparatus is enabled for an "address search." It may be said that the system is in the "selected stop search" mode.

Under these conditions, each time the block number of a forwardly passing tape block is read (and stored in register NTR), and an A or B code is read, so that the hold flip-flop HR is set, the two inputs HR and EADS for a gate 210 (FIG. 5*d*) become "1" and the output of such gate sets a flip-flop SHO. The signals SHO and $\overline{SHO}$ respectively become "1" and "0."

The system will now operate to perform the "need-have" comparison and the "previously accepted" test for each block which passes through the reader, but in addition, the block number for the passing block will be compared with that dialed into the switches NADS—and only when the latter two agree, the tape reader and the entire system will be stopped (providing the system is not in a hunt mode).

To accomplish this, a COMPARE II device is coupled to receive on its two sets of input trunks the number-representing output signals of the register NTR and the switch bank NADS. When enabled by a "1" signal applied to its terminal EC, the COMPARE II device produces a "1" signal on one of its two output lines $NTR=NADS$ or $NTR \neq NADS$, indicating that the two compared numbers are respectively equal or unequal. When either such response occurs, it passes through an OR circuit 211 to make a "compare complete" CIIC signal "1," indicating that the comparison is complete, such signal passing through a delay device 212 to reset the flip-flop SHO. Thus, the response of the COMPARE II device is only momentary, lasting for example only a few microseconds.

As each block on the tape is passed through the reader, the "need-have" comparison will occur, and either signal NH= or the signal NH≠ will become "1." If NH≠ becomes "1," it will pass through an OR circuit 214 to the input of a gate 215 which will thus supply an enabling "1" to the COMPARE II terminal EC because flip-flop SHO was set when the signal HR became "1." On the other hand, if NH= becomes "1," the COMPARE I device will be enabled, resulting in the "compare complete" signal CIC becoming "1." Thus, the CIC signal will pass through the OR circuit 214 and the gate 215 to enable the COMPARE II device. Thus, whenever flip-flop EADS is set to indicate that a selected block number search is on, and the flip-flop SHO is set during the "hold" which occurs after the block number has been read from the passing block, the COMPARE II device will be enabled irrespective of whether the "need" and "have" are equal or unequal; and if they are equal, irrespective of whether the COMPARE I device produces a signal $NTR \leqq A/BNAR$ or $NTR > A/BNAR$.

When the flip-flop SHO is set as the "hold" begins for each passing block, the signal $\overline{SHO}$ switches to "0" and disables gate 128 (FIG. 5*c*) and gate 151 (FIG. 5*a*). Thus, the flip-flop HR cannot be reset and the hold terminated in response to signal RJB becoming "1" (as a result of either NH≠ becoming "1" or the signal $NTR \lesseqgtr A/BNAR$ becoming "1"); nor can the flip-flop HR be reset by a "1" output from the gate 128 if signal $NTR > A/BNAR$ becomes a "1." In effect, the "hold" is continued until after the COMPARE II device has performed its comparison, and only then is the flip-flop HR reset in a manner to be described below.

From the foregoing, it will be apparent that when the apparatus is in the selected stop search mode, the flip-flop SHO will be set as each passing block is temporarily stopped in a hold mode (so HR becomes "1") and the COMPARE II device will be enabled regardless of the result of the "need-have" comparison or the result of the block number comparison performed by the COMPARE I device. The hold mode will continue until after the COMPARE II device responds.

The response of the COMPARE II device will make one of the signals $NTR = NADS$ or $NTR \neq NADS$ momentarily become "1." In the latter case, the signal CIIC will also become a "1," and will pass through the OR circuit 129 (FIG. 5*c*) to the terminal CC, thereupon resetting the hold flip-flop HR and restarting the tape reader. Therefore, the system will not be stopped when the "dialed in" block number is not equal to the block number for the passing block.

When the COMPARE II device makes the signal $NTR = NADS$ momentarily "1," the CIIC becomes a "1" and resets flip-flop HR in the same manner. However, the $NTR = NADS$ signal also produces a "1" response from the OR circuit 205, and such response passes through gate 206 (when, as assumed, $\overline{HTO}$ is "1") to make the STOP signal "1." Therefore, the RUN flip-flop is reset almost simultaneously with the resetting of the flip-flop HR, so the gates 95 and 174 are disabled and the reader 34 cannot restart. In this way, the reader and the system as a whole is stopped. The STOP signal also resets the enabling flip-flop EADS.

When stopping occurs in this latter fashion, the tape is stopped with the A or B code row of the passing block alined with the sensing elements in the senser 56. Preferably means are provided then to back up the tape until the first code row N of that block is so alined, but in the interest of brevity such means will not be here shown or described, but those skilled in the art will readily perceive the apparatus that may be used for this purpose.

When the system is stopped in any of the three ways set forth above, the flip-flop RUN is reset. The operator may restart the system simply by momentarily depressing a START switch (FIG. 5*a*) and thereby setting the RUN flip-flop. The start-up sequences will be more fully detailed below.

H. *Prevention of hunting beyond a stopping or recoordination point on the tape*

In any situation where stopping of the automatic reading of the punched tape is required, i.e. (a) when the E code is read from the tape, (b) a P code is read from the tape and the "planned stop" has been enabled by setting flip-flop EPS, or (c) an operator's selected stopping point has been dialed in and enabled by setting flip-flop EADS—then it is desirable to prevent the hunting of data beyond the point on the tape at which stopping is to occur. Moreover, it is a provision of the present system that stopping at any selected point will not take place until all blocks of data prior to the stopping point on the tape have been accepted for execution. Suppose stopping in one of the three fashions is to occur after execution of block N045, which contains B data, and that the closest preceding block which contains A data is block N040. If during the period when the data processor is executing the command represented by B data block N041 (and B data block N042 is in the B temporary registers), the data processor calls for more A data, but the data from block N040 is already in the A temporary registers, then the data of block N040 will be dumped into active storage, and the reader control system will begin to hunt for further A data on the tape. The hunting would involve rejection of B data blocks N043, N044 and N045—and if it continued, it could proceed to the next A data block, say, N050. But if the machining operation required that a different type of cutter be mounted in the A head turret prior to execution of the block N050 commands, then the acceptance of A data without stopping to permit a tool change could very possibly result in ruining the workpiece. The same rationale applies to stops which may be necessary to effect a critical measurement on the workpiece, or to make manual adjustments (such as a tool wear or deflection compensation when a different tool in the turret is brought into play).

The present invention in one of its aspects includes means to prevent the system from hunting beyond a stopping point, regardless of the particular manner that stopping point is designated. In a sense, therefore, an E code on the tape, a P code on the tape, or a block number on the tape equal to the dialed operator's selected stopping block number may be considered as special codes to which the system will respond in order to limit hunting beyond that point. More particularly, the system is caused to execute all blocks of A and B data which appear on the tape prior to a stopping point, and then to stop. This may in some cases result in one of the two heads coming to rest and simply waiting for the other head to carry out its motions commanded by data appearing prior to the stopping point on the tape.

Moreover, in accordance with the invention, the extent of hunting is purposely limited so that the tape cannot be run forwardly during hunting beyond special codes, placed on the tape at the direction of the programmer, until all data blocks for both heads appearing on the tape in advance of each such special code have been executed. This gives the programmer control over coordination of the two machine tool head paths, and permits him to make one head stop and wait for the other head if there is danger that they might collide. These special codes are placed at what might be called recoordination points on the tape, since they will result in the two heads continuing from known locations—but without completely stopping the whole system.

Although a special code other than that used to designate planned stops may be employed for recoordination, the system as here disclosed uses the P code for that purpose. It will be pointed out below how the system is prevented from hunting beyond any P code on the tape, and how blocks following a P code will be read and executed only after all blocks in advance of such P codes have been read and accepted.

The limitation on hunting is achieved by signaling that, for the type of data being sought, the "last block has been used." The apparatus and its operation in this respect will now be described under the various circumstances which may arise.

(1) LIMITATION OF HUNTING WHEN AN E CODE IS READ

Let it be assumed that the tape reader is at rest with the end of block N017 on the exemplary tape shown in FIG. 4 disposed in the senser 56, with the data for B blocks N012 and N014 respectively held in the B temporary and active registers, and with the data for A blocks N016 and N017 respectively held in the A temporary and active registers. Assume now that an AEPC signal is produced by the data processing system—indicating that more A data is required. In response to that, and by virtue of the operations already described:

(a) The data for block N017 is transferred from A temporary to A active storage.

(b) The tape reader is started forwardly.

(c) The B data block N018 is read and rejected, and the system begins hunting. Block number N018 is stored in register NAR.

(d) The B data block N019 is rejected.

(e) The data block N020 is read, and accepted into the A temporary registers.

(f) The tape is transported reversely, and stopped with the beginning of the B block N018 disposed in the tape reader.

Now, assuming that the A head next completes its operations commanded by the data of block N017 (now in A active storage and that an AEPC signal appears:

(a) The data for A block N020 is dumped from A temporary to active storage, and the A head begins executing the commands constituted by that data. The block number 020 is dumped from register ANTR into active register ANAR.

(b) The tape reader is started forwardly.

(c) The B data block N018 is read and rejected; the block number N018 is stored in the register NAR and the system goes into a hunt mode. Because A data is being hunted, the flip-flop HTA is set.

(d) The B data block N019 is rejected and the reader continues to run forwardly.

(e) The A data block N020 is sensed, but it is skipped because its block number 020 placed temporarily in the register NTR is found by the COMPARE I device to be equal to, and thus not greater than the block number 020 then stored in the active register ANAR, i.e., that block of data has been previously accepted.

(f) The B blocks N021, N022, N023 are sensed and rejected.

(g) At this time, the signal HTA is "1" because the A temporary registers are "emtpy"; the signal HT0 is a "1"; there is a "need A" signal $NAD=1$; and the flip-flop ADR is reset.

(h) Then the E code (shown on the tape in FIG. 4) is read and a "1" appears on the E output terminal of the decoder 62.

When that E signal appears, it passes as one input to the OR circuit 205, and the latter produces a "1" output. However, no STOP signal is created because the system is in a hunt mode and the signal $\overline{HTO}$ is a "0," disabling the gate 206.

In accordance with the invention, provision is made to terminate the forward hunting—and to return the tape reversely through the reader to the first unused, rejected block—in response to a stopping point or recoordination point being reached on the punched tape during hunting. For this purpose, the $E=1$ signal is applied as one input to an OR circuit 220 whose output signal HEP thus becomes "1." Because the signal HTO is a "1," and $\overline{HTO}$ a "0," AND gates 221 and 222 are respectively enabled and disabled. Thus, when HEP becomes "1" in the hunt mode, the gate 221 produces a "1" output to set the flip-flop LBU (last block used). The signal LBU and $\overline{LBU}$ respectively become "1" and "0." Moreover, the "1" output of gate 221 passes through the OR circuit 172 to set the flip-flop RSNAR.

As noted above, when flip-flop RSNAR is set, the signal $\overline{RSNAR}$ becomes "0," thereby disabling the gates 92 and 93 (FIG. 5*a*) and preventing the tape reader from running forwardly; the signal RSNAR becomes "1," so that gate 174 is opened to make signal REV a "1," and the tape reader is started reversely; and because the signal $\overline{RSNAR}$ is "0," the gates 134 and 135 will be disabled so that none of the reader output signals can be transferred into the various shifting registers while the tape is being transported reversely.

When the tape has reversed to the beginning of the first unused block N018 rejected when the hunting began, the COMPARE III device signals $NAR=NTR$, and the tape reader is stopped when flip-flop RSNAR is reset. As the signal $\overline{RSNAR}$ reverts to the "1," the hunt A flip-flop HTA is reset.

However, at the time when the signal LBU became "1," it partially enabled two gates 225 and 226 (FIG. 5*c*) having second inputs HTA and HTB. In the assumed example, A data was being hunted, so HTA is a "1." In consequence, the gate 225 produced a "1" output which passed through the OR circuit 144 to reset flip-flop NAD. Thus, when "last block used" is signaled, the "need" is artificially terminated by switching the signal NAD from "1" to "0." Therefore, when the reverse searching is terminated, and the signal $\overline{RSNAR}$ reverts to "1," there is neither a NAD or NBD signal (even though the temporary A registers are "empty"), and the tape reader is not restarted in a forward direction.

Because flip-flop LBU is set, and signal $\overline{LBU}$ is "0," the gate 156 (FIG. 5*d*) is disabled, and thus the "enable hunt" signal EHT cannot become "1" so long as that condition obtains. Therefore, when the system is in a "last block used" condition, all blocks containing the type of data (in this example, A) which was being hunted have already been accepted, so there can be no requirement for "hunting," and neither of the flip-flops HTA or HTB can be set.

At some time after the flip-flop LBU has been set in response to reading an E code while hunting for A data (or indeed during such hunting), the B head will complete execution of the command information in active B storage (assumed in the example to be data of block N012), and a BEPC signal will appear. To pursue the example set forth above, the data of block N014 will be dumped into the active B registers, the flip-flop BDR will be reset, the flip-flop NBD will be set, and the tape reader will be started forwardly to begin reading the block N018. The data for that block will be accepted into temporary storage. After the commands for B data block N014 have been executed, and data from block N018 transferred into active storage, block N019 will be read and accepted into temporary storage. The data for block N020 will be skipped and ignored when block N018 has been executed, and the data for block N021 will be accepted. Then B blocks N022 and N023 will be read and accepted in succession.

The tape reader will stop at the EL code row of the last B block N023 after the latter has been read and accepted. When the next BEPC signal appears and the data for block N023 is transferred to active storage, the tape reader will be started forwardly. It will immediately read the E code, and because the system is not in the hunt mode ($HTO=0$; $\overline{HTO}=1$), the tape reader and the system as a whole will stop in the fashion described above, due to a "1" signal passing through the OR circuit 205 and the gate 206 to the STOP terminal. The STOP signal resets the RUN flip-flop.

Also, when the E signal thus becomes "1" when the E code is read a second time, it passes through the OR circuit 220 to make the signal HEP "1." Because the signal HTO is now "0," gate 221 is closed; and because the signal $\overline{HTO}$ is now "1," the HEP signal passes through gate 222 to reset flip-flop LBU, and the system is restored to its normal condition, but stopped with the flip-flop RUN reset.

(2) LIMITATION OF HUNTING WHEN A P CODE IS READ

It may be observed that the P terminal of the decoder 62 (FIG. 5*a*) is connected directly as one input to the OR circuit 220 (FIG. 5*d*) which receives the E signal as another input. Thus, when any P code is read from the punched tape while the system is in the hunt mode, the response will be the same as that to an E code, namely:

(a) The HEP signal will become "1," and pass through the gate 221 to set flip-flop LBU and through OR circuit 172 to set flip-flop RSNAR.

(b) The tape reader will run reversely in a reverse search mode until it is stopped at the beginning of the first unused, previously rejected block on the tape. Flip-flop RSNAR will then be reset, and HTA or HTB will be reset.

(c) The tape reader will now be restarted only in response to a "need" for the type of data (say, B) not previously being hunted because all blocks of the other type of data (say, A) prior to the P code on the tape have already been accepted or used.

(d) The system will thus read and accept all of such blocks (say, B) until it finally reads that same P code a second time.

(e) If the operator's optional planned stop has been enabled and flip-flop EPS is set, the first reading of the P code cannot make the STOP signal "1," even though the signal E·EPS becomes "1," because $\overline{HTO}$ is "0" and the gate 206 is disabled. When the P code is read a second time, however, the signals HTO and $\overline{HTO}$ are respectively "0" and "1," so that the signal STOP becomes "1," flip-flop LBU is reset, and flip-flop RSNAR is left reset. Thus, the system comes to a complete stop, as described above.

It is, of course, quite possible that when a P code row is read a first time while the system is hunting, the EPS flip-flop is not set because the operator, not wishing to completely stop the system at that point, has not depressed the enabling switch PS. Under these circumstances, the response to the first reading of the P code is, via OR circuit 220 and gate 221, the setting of flip-flops LBU and RSNAR. The punched tape is thus driven reversely to the beginning of the first unused, previously rejected block, without the system having found the type of data being hunted.

Then, when all blocks in advance of the P code row on the tape have been read and accepted, and that same P code row is read a second time, the signal HEP becomes a "1," and passes through gate 222 ($\overline{HTO}$ is now "1") to reset flip-flop LBU. The tape reader does not stop or hold when it reads the P code a second time; and it therefore begins reading the next block of data from the tape. If that next block contains A data, and if the A head is at rest because the "last block used" condition was initiated when there was hunting for A data, the signals ZFRA and $\overline{LBU}$ will be "1" when the signal HAD becomes "1," so that a gate 230 (FIG. 5*c*) will transfer a "1" through OR circuit 85 to set flip-flop NAD—even though no RCA signal can be created. Therefore, this block of information is accepted into the A temporary storage registers—in a sequence operations similar to the start-up procedure discussed below. The system in this way continues operations for the A and B head after one head has been held up and recoordinated with the other in response to a P code when a "planned stop" is not enabled.

The AND gate 231 shown in FIG. 5*c* serves the same function as the gate 230, except it operates in response to a ZRFB, HBD, and $\overline{LBU}$ signals to set the flip-flop NBD.

(3) LIMITATION OF HUNTING WHEN AN OPERATOR'S SELECTED STOP IS REACHED

As noted above, when the operator dials a selected block number on the switch bank NADS and enables the operator's selected stop depressing switch EOS momentarily to set the flip-flop EADS, the COMPARE II device will make the signal NTR=NADS a "1" when the selected block on the tape is reached. If the system is not in a hunt mode, the gate 206 will make the signal STOP become "1," and the system will stop.

However, suppose the operator has dialed block number 146 into switch bank NADS and momentarily depressed the switch EOS. If block N146 should be reached on the tape when the system is in a hunt mode, i.e., some preceding blocks have been rejected, it is desirable not to let the system actually stop until all such preceding blocks have been read and accepted.

As here shown, the response to the signal NTR=NADS becoming "1" is the same as that to reading an E code—inasmuch as the E and NTR=NADS signals are both supplied as inputs to the OR circuits 205 and 220. Therefore, when signal NTR=NADS becomes a "1" at a time when the system is hunting (HTO=1), the STOP signal does not become "1" (gate 206 is disabled), but the HEP signal becomes "1" to set both flip-flop LBU and RSNAR. The tape reader thus reversely returns the tape to the first unused and rejected block. Thereafter, the previously rejected blocks are accepted in sequence. When the signal NTR=NADS becomes "1" a second time, the flip-flop LBU is reset, and the STOP signal becomes "1," so the system then comes to a complete stop.

I. *Starting the system*

In the description set forth above, it has been assumed that the system was in operation (flip-flop RUN set), so that the tape reader would be started automatically in response to the appearance of a "need A data" or "need B data" signal. When the system is initially to be put into operation, or it is to be restarted after stopping in any of the three ways described, the sequences of operations are somewhat different. These will now be explained.

When the system is initially to be started, or has been stopped and is to be restarted, the A and B temporary and active storage registers contain no fresh, useful data. Prior to initial start-up they may all be set to contain zero by reset means (not shown) and after stopping they continue to hold numbers representing displacement commands which have been fully executed. In effect, all A and B registers for X and Y data are empty, but the active block number registers ANAR and BNAR will be holding 000 (for initial start-up) or the number for the last-executed A and B blocks (for restart after a stop). The flip-flop RUN and an associated flip-flop STFR (FIG. 5*a*) will both be in their reset states—and all other flip-flops will be reset. The signals AEPC and BEPC will both be "1" because the two heads A and B will be occupying positions corresponding to the numbers in A and B active storage, e.g., if those X and Y numbers are zero, the heads will be at zero-zero coordinate positions. Yet, because the signals ADR and BDR are both "0," the gates 78 and 79 are closed, so the signals RCA and RCB will be "0." However, both machine tool heads will be at rest (zero feed rate), so the director will at this time make the control signals ZFRA and ZFRB both "1's."

The operator need now only momentarily depress the push-button switch START, thereby setting the flip-flop RUN. Because the signal RUN switches to "1," this sets the start forward flip-flop STFR, so that its output signal STFR becomes "1" and passes through the OR circuit 94 to an input of gate 95 which is enabled because its other two input signals RUN and $\overline{HR}$ are both "1." Thus, the signal FOR becomes "1," the solenoid FS is energized, and the reader starts forwardly.

It will be assumed for purposes of explanation that the system is being initially started at the beginning of punched tape whose first four blocks N001, N002, N003, N004 respectively contain A, B, A and B data as shown in FIG. 4. When the reader is so started, it reads N001A, and the hold flip-flop HR is set to create a hold mode. Because the signal HR switches to "1," the flip-flop STFR is reset. In the manner previously explained, the block number 001 has been shifted into the register NTR, and the flip-flop HAD is set.

Since the signal ZFRA is now "1," $\overline{LBU}$ is "1," and HAD is "1," the gate 230 is enabled, and its output acting through OR circuit 85 sets flip-flop NAD. In effect, a "need A data" signal is thus artificially created. When the signal NAD becomes "1," the gate 92 is enabled, but gate 95 is disabled because $\overline{HR}$ is "0" in the hold mode.

The signals HAD and NAD are now both "1." Thus, the gate 110 and associated apparatus make the signal NH=, derived from AND gate 114 (right portion of FIG. 5*c*) momentarily "1." In consequence, the flip-flop CPH is set and the COMPARE I device is enabled, and the latter makes the signal *NTR>A/BNAR* momentarily "1" because the number 001 then held in register NTR greater than the number 000 then held in register ANAR. Thus, the gate 128 and OR circuit 129 make the CC signal a "1," and this resets the flip-flop HR, removing the "hold." The signal $\overline{HR}$ becomes a "1" and the tape reader resumes its forward drive of the tape because the gate 95 is fully enabled to make the FOR signal "1."

The X and Y numbers of the first block N001 are thus read and shifted into the A temporary registers because the signal HAD is "1" and enables gate 134. When the EL code is read, and because signal HAD is now a "1," the gate140 sets the flip-flop ADR. The ADR signal acting through the OR circuit 144 resets flip-flop NAD, so that signal NAD becomes "0" and disqualifies the gate 92. The reader tends to stop.

However, since the signals AEPC and ADR are now both "1," the gate 78 and delay 80 make the signal RCA "1" very shortly after the flip-flop NAD is reset. The RCA signual causes data of block N001 in the temporary registers to be dumped into the A active registers, and the A head of the machine tool begins to move in execution of first commanded increment of motion. As an incident to the signal ADR becoming "1," the flip-flop HAD is reset; and as an incident to the signal RCA becoming "1," the flip-flop NAD is set.

Since the signal NAD is restored to "1," the gate 92 produces a "1" output, so that the tape reader is restarted. It reads N002B from the second block and stops in a hold mode when the flip-flop HR is set. The flip-flop HBD is set in response to reading of the B code.

Because all signals HBD, $\overline{LBU}$, and ZFRB are "1," the gate 231 produces a "1" output which passes through OR circuit 87 to set the flip-flop NBD. Thus, the signals existing are *HBD*=1, *NBD*=1, *HAD*=0, and *NAD*=1. The gate 110 thus produces a "0" output signal, but the gate 111 produces a "1" output. The latter in acting through OR circuit 112 causes gate 114 to switch the signal NH= to "1," while the NH≠ signal remains "0." Thus, the COMPARE I device is enabled and its output

*NTR>A/BNAR* becomes "1" because the number 002 held in register NTR is greater than the number 000 then held in register BNAR. A "1" signal then appears on terminal CC and causes flip-flop HR to reset, so the hold mode is terminated and the tape is again driven forwardly. Data read from the block N002 is shifted into the B temporary registers because HBD is a "1" and the gate 135 is enabled.

When the last row of the second block is read, the signal EL becomes "1," the flip-flop BDR is in consequence set by the output from gate 141, and when signal BDR becomes "1" it resets flip-flop NBD. The BDR signal also resets flip-flop HBD. Yet, because the BEPC and BDR signals are both "1," the gate 79 and delay device 81 very shortly thereafter make the dumping signal RCB "1" to transfer the N002 block data from the temporary to the active B registers. As an incident to signal RCB being momentarily "1," the flip-flop NBD is set through OR circuit 87. Thus, the reader hardly pauses at the last row of the second block, but continues to read into the third block. At this time both signals NAD and NBD are "1." Both the A and B temporary registers are "empty," but the A and B heads of the machine tool are now moving to execute the command defined by the data of blocks N001 and N002 respectively, so the signals ZFRA, ZFRB, AEPC and BEPC are all "0."

As the third block is read, the code rows N003A are signaled. A "hold" occurs when the A code is read, and the flip-flop HAD is set. The relevant signals are now *HAD*="1," *HBD*="0," *NAD*="1," *NBD*="1." Gate 110 produces a "1" output and the signal NH= becomes "1." COMPARE I device functions, and the CC signal becomes "1" so the hold flip-flop HR is reset. The remainder of block N003 is read and accepted into the A temporary registers. When the last row of this block is read, the EL signal becomes "1," so flip-flop ADR is set, but the RCA does not become "1" at this time since the signal AEPC is "0." When flip-flop ADR sets, flip-flops NAD and HAD are both reset. Now data of blocks N001 and N003 are respectively in A active and A temporary storage; the data of block N002 is in the B active registers; and the B temporary registers are "empty."

However, the signal NBD is still "1," so the reader does not stop when the EL code is read from the third block N003. Instead, such block is read, the need and have are found equal (*HBD*=1, *NBD*=1), and the data for the block is shifted into the B temporary registers. When this is accomplished, BDR is set, HBD is reset, and NBD is reset.

The system now has the active and temporary A and B registers filled with fresh data, and the A and B heads are in motion executing blocks N001 and N002 respectively. When either head completes such execution, and an AEPC or BEPC signal appears, the tape reader will be started to read the next block, or if necessary, to hunt for a block containing the needed type of data.

It will be apparent after a moment's study that if the first two blocks found on the tape after start-up are for the same head, they will be read and transferred into the active and temporary storage registers for that head. The reader will then stop because there will exist no "need" signal (NAD or NBD). Yet, when the next end point compare signal (AEPC or BEPC) for the first head put into operation appears, the reader will be started, and even though the next block on the tape contains data for the other head, it will be accepted into temporary storage and dumped into active storage after which there will remain a "need" signal. Thus, the system will find, after hunting if necessary, a second block of the same kind of data and transfer it into temporary storage.

J. *Resume of operation*

The organization and operation of the present record reading system will be clear from the foregoing description, but the system as a whole and the advantages which it brings to the art may be better understood from a brief resume.

The record medium, here described as a punched tape 32, may contain successive blocks of data represented by digital, code indicia, each block of data designating a particular commanded operation for one of a plurality of utilization devices. In the exemplary embodiment, each block of data defines a commanded incremental displacement (resulting from simultaneous movement along two axes) of the A head or the B head of the machine tool shown in FIG. 1. The successive incremental displacements for each head make up a continuous path of motion necessary to cause cutters carried in the machine heads to machine a desired shape or contour on the workpiece.

The two heads of the machine tool execute their individual motion programs simultaneously, yet each block of data for either head may require a time for completion which has no relation to the time required to execute other blocks for the same or a different head. Nevertheless, the present system makes it possible for the A and B data blocks to be randomly interspersed in the order of their appearance on the record medium, as illustrated for example by the punched tape shown in FIG. 4. The programmer who prepares the data commanding the successive increments of motion in the first instance, need not be concerned with the matter of how long each block of data will require for execution, and need not designate any particular order of appearance of the A and B data blocks to be certain that the data processor will receive sets of information at proper intervals to keep the A and B heads operating substantially continuously.

On the contrary, and as described above, the present system operates to read and supply A data from the punched tape 32 to the data processor when more A data is needed, and to read and supply B data when more B data is needed—regardless of the order of appearance, and the execution times for the A and B data blocks on the punched tape 32.

Consider that the first four blocks N001–N004 on the tape 32 (FIG. 4) have been read after initial start-up, as described above, and the tape reader 32 has been stopped with the last row (EL) of the fourth block disposed in the tapen sensor 56 (FIG. 5*a*). The data of the first four blocks is stored and electrically signaled as follows:

Block N001A data: In A active registers
Block N002B data: In B active registers
Block N003A data: In A temporary registers
Block N004B data: In B temporary registers The output signals from the A and B active registers are thus causing the contouring director 40 to supply signals to the A and B head servo drives which are moving the A and B heads to carry out the motion commands represented by the data blocks N001 and N002, respectively.

Either the A or the B head will complete execution of its in-progress incremental displacement first. The two cases may be separately considered.

(1) IF THE A HEAD EXECUTES BLOCKS N001 BEFORE THE B HEAD EXECUTES BLOCK N002

When the A head has carried out the command of block N001, the director will make the signal AEPC become "1." In consequence the gate 78 and delay 80 (FIG. 5*c*) will produce an RCA signal which opens dump gates 64, 65 and 72 (FIG. 5*b*) to transfer the block N003 data from the A temporary registers to the A active registers. The data processing director system immediately causes the A head to continue its motion—but now in execution of the block N003 commands.

But when such dumping occurs, the flip-flop NAD is set to create a "need A data" signal, and this in turn causes the tape reader 34 to be started forwardly. Accordingly, the first four rows (N, 0, 0, 5, A) of block N005 will be read from the tape, the block number 005 will be shifted into the temporary register NTR, as previously described. The flip-flop HAD will be set to signal "have A data." Merely to give sufficient time for comparing operations (and this may be unnecessary if the comparing apparatus is fast or the tape reader is relatively slow), the flip-flop HR set to "hold" up the reader operations.

Now, the "needed" type of data is compared with the "have" type of data. Because the "need" and the "have" agree, this is indicated by the NH= signal becoming momentarily "1." The COMPARE I device is enabled (to compare the block number for the last-accepted A block, now stored in register ANAR, with that of the passing block, now stored in register NTR) and makes the signal $NTR>A/BNAR$ momentarily "1." The reject flip-flop is not set, but the signal on terminal CC becomes momentarily "1" resetting flip-flop HR so that the reader continues its forward drive of the punched tape. The data for block N005 is thus shifted into the A temporary registers because the gate 135 opens each time the decoder 62 produces a # signal, and the output signal A#S from that gate opens the gates G2 and G3 to shift X or Y numbers into the temporary storage registers TAXR or TAYR.

The reading of the EL code from block N005 results in resetting flip-flops HAD and NAD to terminate the "need" and "have" signals, and when the NAD signal everts to "0" the tape reader stops. The system is momentarily satisfied, and the A head is executing the commands of data block N003, with data block N005 held in the A temporary registers.

Thus, it will be seen that when there is a "need" of one type of data, and that type of data is found in a block passing through the reader, the data from that block is accepted and shifted into the appropriate set of temporary registers.

(2) IF THE B HEAD EXECUTES BLOCK N002 BEFORE THE A HEAD EXECUTES BLOCK N001

Reverting to the originally assumed condition (with the tape reader stopped at the end of block N004), assume now that the B head completes execution of the block N002 commands and the director makes the BEPC signal "1." The gate 79 and delay 81 produces an RCB signal, which in turn opens dump gates 66, 67 and 73 to transfer data of block N004 from the B temporary to the B active registers. The B head, without substantial interruption of motion, immediately begins to execute the commands of block N004.

But when the RCB signal appears the flip-flop NBD is set to signal "need B data," and in consequence, the tape reader is started forwardly. It reads the rows N, 0, 0, 5, A from block N005, and the block number 005 is stored in register NTR. The "A" signal causes flip-flop HAD to set, signaling "have A data," and the flip-flop HR is set to hold the reader operation.

Now, because the "need" and "have" are not equal, the signal NH≠ becomes "1." As a result:

(a) The reject flip-flop RJB is set and the signal RJB which becomes "1" passes through gate 151 and OR circuit 130 to reset flip-flop HR. The forward actuation of the reader continues.

(b) But the NH≠ signal also acts through gate 156 (FIG. 5*d*) to make signal EHT a "1," so that dump gates 74 (FIG. 5*b*) opens to transfer the block number 005 from register NTR into register NAR.

(c) When flip-flop EHT sets, flip-flop HTA is set and the signal HTO becomes "1." The system is now in a hunt mode, having found A data in block 005 when there is a need for B data.

(d) As the tape continues forwardly through the reader, the data of block N005 is rejected because when the RJB signal became "1" it reset the flip-flop HAD so gates 134 and 135 are both disabled and the shift register input gates G2–G5 all remain closed.

(e) When the last row EL of the block N005 is read, the EL signal resets the reject flip-flop RJB. The flip-flop NBD remains set, so the reader does not stop.

The reader now reads N, 0, 0, 6, B from block N006, and the flip-flop HR is set to hold the reader. Flip-flop HBD is set in response to reading of the "B." Because signals NBD and HBD are now both "1," the signal NH= becomes "1," and the COMPARE I device is enabled. It compares block number 004 ( in register BNAR) with block number 006 (in register NTR) and finds the latter greater, thereby indicating that the passing block has not been previously accepted. Thus, signal CC becomes "1," the HR flip-flop is reset, and the forward motion of the tape is continued. The data from block N006 is shifted into the B temporary registers.

When the last code row (EL) of the block N006 is read, the output of gate 141 sets flip-flop BDR, and this in turn resets flip-flops NBD and HBD. Therefore, the "need" signal is destroyed and the forward energization of the tape reader terminated.

However, at the instant flip-flop BDR sets, and the signal BDR switches to "1," the hunt flip-flop HTB is still set. Thus, the output of gate 171 (FIG. 5*d*) sets flip-flop RSNAR. Because the signal RSNAR is now "1," the REV signal from gate 174 (FIG. 5*a*) becomes "1," and the tape reader is actuated reversely. The $\overline{RSNAR}$ signal now being "0," both gates 134 and 135 are disabled and shifting of data into the A and B temporary registers is inhibited while the tape is being driven reversely through the reader.

Yet, when first five rows of block N006 are read in reverse order, the reader and decoder 62 will produce output signals B, 6, 0, 0, N in that order. When the B is read, the signal A/B becomes "1," and since signal REV is "1," the digits, 6, 0, 0, are entered in that order through the gate G6 into the shift register NTR. When the N is read, the output of gate 176 sets flip-flop HR and places the reader in hold.

When the signals HR and RSNAR are thus both "1," the output of gate 180 (FIG. 5*d*) enables the COMPARE III device. It finds the block number 005 (in register NAR) for the first rejected block N005 is unequal to the block number 006 (stored in reverse order in register NTR), and thus makes the signal $NAR \neq NTR$ a "1." The resulting output RCC from OR circuit 181 becomes "1" and resets flip-flop HR, so reverse travel of the tape through the reader is resumed.

As the first five lines of block N005 are read in reverse order, the reader produces the signals A, 5, 0, 0, N in that order. The numbers 5, 0, 0 are shifted in that order into register NTR, and the flip-flop HR is set in response to reading of the N, holding the reader.

The COMPARE III device is enabled. It finds the number (005) stored reversely in register NTR equal to the number (005) in register NAR, and makes signal $NAR = NTR$ a "1." This signal resets flip-flop RSNAR. That same signal also makes RCC a "1" and resets flip-flop HR, but the tape reader is not energized because signal RSNAR is now "0" so the gate 174 is disabled. The tape has thus been driven reversely through the reader and stopped at the beginning of the first block (N005) which was rejected when hunting for B data began.

It will be apparent, therefore, that the system provides for hunting through the tape until a block corresponding to the "needed" type of data is found and accepted. The tape is then driven reversely to position it in the reader such that, upon restarting, the first block of unused and rejected data will be read.

(3) REPEATED HUNTING

It is quite possible that hunting for a given type of data, and reversely returning the tape, may occur several times. Reverting to the situation just described, i.e., with the B data block N006 of FIG. 4 having been read, after hunting, into B temporary storage and the tape having been returned to the beginning of A data block N005—suppose now that another BEPC signal appears (the A head still executing the commands of block N001 and the data of block N003 being in the A temporary storage registers). The tape reader will start, sense the first few lines of A data block N005, go into a "hunt B" mode, and the data of block N005 will be rejected. The first few lines N, 0, 0, 6, B of block N006 will be read—but upon operation of the COMPARE I device, it will be found that the block number 006 thus stored in register NTR is not greater than (because it is equal to) the block number 006 then in the active register BNAR. Thus, the signal $NTR \overline{\gtrless} A/BNAR$ will become momentarily "1" and set the reject flip-flop RJB (FIG. 5*c*). The "hold" on the reader will be removed, and forward drive on the tape will continue, with the data of block N006 being skipped, i.e., inhibited from transfer into the B temporary registers. Thus, the system skips and rejects the data from any tape block if such data has already been read and accepted, and it does so by virtue of means to compare the block number of the passing block with that for the last-accepted block of the same type of data.

Then, the tape reader will begin reading the B data block N007, while hunting for B data. This block will be accepted into temporary B storage, and the tape will be reversely driven to the beginning of block N005 (the first block rejected).

If now still another BEPC signal appears, the A block

N005 will be sensed, the "hunt B" mode initiated, and the data for that block rejected. The tape reader will continue forwardly through B data blocks N006 and N007, but the data will be rejected because they have been previously accepted. The data from B block N008 will be read and accepted, and the tape reversely driven to locate the beginning of block N005 (the first block rejected).

If now another BEPC signal occurs (the A head still executing the commands of block N001), the system will go into a "hunt B data" mode; reject block N005; continue reading the tape forwardly but reject previously accepted blocks N006, N007 and N008; read and accept B data from block N009; and then return the tape to the beginning of block N005 (the first unused, rejected block).

Indeed, suppose still another BEPC signal is received. The tape reader will be run forwardly, hunting B data, but data from blocks N005 through N009 will be rejected. The block N010 will be sensed, but because it contains A data whereas B data is being hunted, it too will be rejected. Then the B data from block N011 will be read and accepted, and the tape driven reversely until the beginning of block N005 is disposed in the reader.

Suppose, still further, that another BEPC signal occurs. The block number 005 will be stored in register NAR, the tape will be advanced forwardly, and the data from blocks N006 through N011 will be rejected. But if, as shown in FIG. 4, a P code appears after block N011 on the tape, the reading of this recoordination code will limit the hunting. When the P code is read and a corresponding "1" signal is applied to the input of OR circuit 220 (FIG. 5*d*) the signal HEP will become "1." Because B data is being hunted at this instant, the signals HTB and HTO are both "1." Thus, the gate 221 passes a signal to set flip-flop LBU. When signal LBU thus becomes "1," the output of gate 226 (FIG. 5*c*) acting through OR circuit 145 resets flip-flop NBD; and the output of gate 221 (FIG. 5*d*) sets flip-flop RSNAR. The tape will thus be driven reversely until the beginning of block N005 is again disposed in the reader, and the hunt flip-flop HTB will be reset. At this time, the A head is still executing the block N001 commands; data of block N003 is still in the A temporary storage registers; the B head is now executing the commands of data block N011 (held in the active B registers); the B temporary registers are "empty"; and the signals HAD, HBD, NAD, NBD, BDR, HTA, HTB and HTO are all "0."

When the B head completes the execution of block N011, the signal BEPC will become "1," but it will not make the signal RCB nor the signal NBD "1" because the flip-flop BDR is in its reset state and the gate 79 is closed. The tape reader will not be restated when that BEPC signal appears. Thus, the B head comes to rest because it has executed all B blocks of data which appear on the punched tape prior to the P code shown in FIG. 4. The B head waits for the A head to "recoordinate" or "catch-up," and while the B head is at rest the signals BEPC and ZFRB are both "1." When the next AEPC signal appears, the reader is started and the data from block N005 will be read and accepted into the A temporary registers (after the data of block N003 have been dumped, in response to an RCA signal, into the A active registers). The tape is stopped at the end of block N005.

When the next AEPC signal appears, the signal NAD becomes "1" and the reader is started forwardly to begin reading B block N006. The flip-flop HBD is thus set, but the gate 231 (FIG. 5*c*) is disabled because signal $\overline{LBU}$ is "0," and so the flip-flop NBD is not set. Thus, neither of the gates 110 or 111 produces a "1" output; the signal NH≠ becomes "1"; the flip-flop RJB is set; and the block N006 is rejected in the manner previously described. The flip-flop HBD is reset, and the flip-flop BDR is left in its reset state.

It should be noted that under these conditions, i.e., the last available block of B data having been used or accepted, the flip-flop LBU is set, the signal $\overline{LBU}$ is a "0," and the gate 156 (FIG. *5d*) is closed—so neither of the hunt flip-flops HTA or HTB can be set. The system is prohibited from going into a hunt mode and does not search reversely after a block has been accepted.

In like manner, the reader will read through, and the system will reject, B data blocks N007, N008, N009. Upon sensing A data in block N010, such data will be accepted into the A temporary registers, and the tape will be stopped at the end of block N010.

In response to the next AEPC signal, the signal NAD will become "1," and the tape will be driven forwardly but data from the B block N011 will be rejected in the same way described above with reference to block N006. Then the P code appearing after block N011 will be read (for a second time). Because the system is not in the hunt mode, when the signal HEP thus becomes "1," the response of the gate 222 will reset the flip-flop LBU, and the system will be restored to normal. The tape reader will continue forwardly and begin to read the B block N012, thereby setting flip-flop HBD. Since signal $\overline{LBU}$ is now "1," the gate 231 (FIG. *5c*) is fully qualified (ZFRB and HBD are both "1"), so that its output passes through the OR circuit 87 to set flip-flop NBD. At this instant, therefore, signals NAD, NBD, and HBD are all "1," but the signal HAD is "0." Thus, the signal NH= becomes "1," the COMPARE I device signals *NTR>A/BNAR*, and the data from block N012 is accepted into the temporary registers. The flip-flop BDR will be set by the response of gate 141 when the EL code is read, and this will cause flip-flops HBD and NBD to reset. Moreover, the gate 79 is fully enabled when the signal BDR becomes "1," and shortly thereafter, the signal RCB becomes "1" to create three effects, vis. (a) dumping of data from block N012 from the B temporary to B active registers, (b) setting of flip-flop NBD, and (c) resetting of flip-flop BDR. The B head will begin moving to carry out the motions commanded by the data of block N012 which is now stored in the active B registers. The signals BEPC and ZFRB will thus change to "0." The B temporary registers are now "empty," but the flip-flop NBD is set to indicate there remains a "need" for B data, and since the signal NBD is a "1" (signal NAD is also still "1") the reader will continue to run forwardly to begin reading the next block N013.

That next block N013 as shown in FIG. 4 contains A data, so the flip-flop HAD will be set, and because the signal NAD is still "1," such data will be accepted into the A temporary registers. Normally, after such acceptance, the reader would be stopped when the flip-flop NAD is reset. However, in the assumed example, flip-flop NBD has been set and remains set after the flip-flop NAD resets in response to acceptance of the data from block N013. Thus, the tape reader continues to run forwardly because the solenoid FS continues to be energized by signals tarnsmitted through the gate 93, OR circuit 94 and gate 95. Thus the system begins reading block N014, finds that it contains B data, and because there is a "need" for B data, the data of block N014 is read and accepted into the B temporary registers.

Upon completion of such acceptance, the flip-flop BDR is set and the flip-flops HBD and NBD are reset. The tape is stopped with the end of block N014 disposed in the reader.

Thus, the data of blocks N010 and N013 are now respectively in the A active and temporary registers; and the data of blocks N012 and N014 are now respectively in the B active and temporary registers. Despite the fact that, in the assumed example, the block N001 required an extremely long time for execution by the A head, the recoordination P code shown on the tape in FIG. 4 forced the B head to "wait" after execution of the B data block N011 until the A data block was transferred into A active storage. In effect, the B head has been held up or recoordinated so that it begins to execute block N012 only when the A head begins to execute block N010.

If the next signal from the director is AEPC, the system will read and accept the A data block N015; but if such next signal is BEPC, the system will hunt to find and accept the next unused B block which in the explanatory example is block N018.

It may be mentioned that if, in hunting, the system reaches an E code, or a block number equal to that dialed into the switch bank NADS is read while the enabling flip-flop EADS is set, then hunting will be limited and terminated in the same sequence of events described as occurring when the P code is read. However, when the E code is read a second time, or a block number equal to that dialed into switch bank NADS is a read a second time while the flip-flop EADS is set, then the system will come to a complete stop. Similarly, if P code is read a second time after a first response thereto curtails hunting, and if the enabling flip-flop EPS is set, then the system will stop. The apparatus and operation for this portion of the system has been described above.

Of course, when the system is not hunting and if an E code is read, or a P code is read when flip-flop EPS is set, or a block number equal to that dialed into switch bank NADS when flip-flops EADS is set, then the system will simply stop. When so stopped, it may be restarted simply by the operator momentarily closing the START switch to set the flip-flop RUN.

In summary, the present system is extremely versatile. Regardless of the order of appearance of the A and B data blocks on a record medium, and regardless of the time required to execute the commands defined by each block, the system will supply the needed type of data to the data processor so that both the A and B heads will be kept simultaneously and substantially continuously in operation. If necessary, the system will "hunt" through the record medium repeatedly to locate the needed type of data, always returning the record medium to the first unused, rejected block so that no block is permanently skipped. In this way the sets of A data are supplied to the data processor in the order that A data blocks appear on the record medium, and the sets of B data are supplied to the processor in the order that B data blocks appear on the record medium—but the A and B data blocks may be randomly interspersed with one another. When any block is passed through the reader twice, because of hunting, it is ignored the second time if it was previously accepted into the data processor registers. Finally, the system can be made to limit hunting beyond special recoordination codes (here described as P codes) so that the programmer by applying these codes to the record medium can force one of the two heads to wait until the other head catches up. And the system will never hunt beyond a stopping point, either one which is mandatory (E code) or optional (an enabled planned stop in response to a P code, or an operator dialed-in and enabled selected stopping point). These features and advantages not only reduce the time and cost of programming the operations of a two-headed machine tool, but they also result in greatly enhanced efficiency and speed with which a complex workpiece may be machined to numerically defined contours by simultaneous action of two or more machine tool heads.

Although for the sake of brevity a system for the simultaneous control of only two utilization devices or machine tool heads has been shown and described herein, it will be apparent that the principles, apparatus and advantages set forth above may be adapted by one skilled in the art to the control of three or four, i.e., any plurality of utilization devices.

The apparatus herein shown and described as an exemplary embodiment of the invention has been purposely made somewhat different and more simplified than the actual apparatus which applicant has designed and constructed for a commerical product—and this has been done in the interest of brevity and clarity. Merely as examples, it will be obvious to those skilled in the art that time-clocked logic systems may be used as a matter of equivalents to effect the functions here described as carried out by directly connected AND gates and OR circuits. If a time multiplex system is employed to signal, say 1000 equal time intervals of two microseconds during each $1/500$ of a second, the various gating and logic functions may be scheduled to occur in different particular ones of such intervals. Moreover, it will also be understood by those skilled in the art that where any difficulty of timing may arise due to progratiom of signals in the illustrated apparatus, this may be overcome by the obvious use of delay circuits, additional AND or OR circuits, or the like. In the interest of keeping the present disclosure reasonably brief and readily understandable, no attempt has been made to show all the components which may be employed as a mater of routine skill to effect proper timing or sequences for the flow of the various logic signals. Further, logic circuits other than the AND and OR circuits, for example, NAND and NOR devices, may be employed as a matter of choice to one skilled in the art in order to carry out the invention here disclosed. Finally, the comparing functions of the COMPARE I, II, or III devices here described may be provided in any suitable way, and it is contemplated that in some instances it may be preferable to use a single comparator on a time-shared basis, or to employ a time-shared adder-subtractor programmed to perform comparing sub-routines on a rapidly repeating basis. In other words, the novel features of the present invention have been described herein with reference to an exemplary embodiment which is somewhat simplified in comparison to an actual commercial embodiment, but it is intended that the claims be interpreted in a manner to cover the many equivalents, known in and readily available to the art, for the specific apparatus here described.

I claim as my invention:

1. In a system for successively supplying sets of information to data processing apparatus which supplies operating signals to at least two simultaneously operating servomechanisms A and B, such information being represented by successive blocks of digital indicia on a record medium with each block including indicia representing an A or B designator and data to be processed respectively for the operation of the A or B utilization device during a particular but unrestricted time period, and the A and B blocks being randomly interspersed along the record, the combination comprising, a record reader having means to selectively transport the record forwardly or reversely therethrough and for producing output signals representative of the indicia in each block of the record as it passes, means for starting said transport means forwardly whenever said data processing apparatus needs additional data for the continued operation of either one of said utilization devices, means for normally transferring reader output signals corresponding to each block of data on the forwardly moving record into the data processing apparatus and thereupon stopping the reader, means for causing the output signals of said reader resulting from each block of information on the record which either (a) contains data for the operation of that one of said utilization devices for which the data processing apparatus does not need additional data, or (b) contains data previously transferred into the data processing apparatus, to be inhibited from transfer into the data processing apparatus, selectively enabled means for actuating said transport means reversely until the record is returned in the reader to the first block of previously unaccepted data, and means responsive to the completed transfer of a block of data into the data processing apparatus following operation of said inhibiting means for enabling said reverse actuating means.

2. The combination set forth in claim 1 in which the record medium has special codes interposed at predetermined points among the blocks of indicia, and further including means responsive to output signals from said reader corresponding to a special code, after operation of said inhibiting means, for enabling said reverse actuating means independently of said means which are responsive to a completed transfer.

3. In a system for supplying successive blocks of numerical command data contained on an elongated record to data processing and servo controls for independently movable A and B heads of a multi-head machine tool so as to keep both heads operating substantially continuously, each block on said record containing successive code rows representing a sequential block number followed by an A or B to designate the head for which the block data is to be used and concluding with numerical command data, the combination comprising a record reader having means to selectively transport the record forwardly or reversely therethrough in a lengthwise direction and means to produce output signals corresponding to the characters and data represented by each code row as it passes, first means for storing the block numbers for those two blocks of data which have most recently been transferred to the data processing apparatus to govern the operation of the A head and the B head, second means for signalling when the data processing apparatus has need to receive more data from the record in order to keep the A or B head respectively in operation, third means responsive to signalling by said second means for starting said transport means forwardly, fourth means for causing output signals produced by said reader from blocks containing A or B codes to be rejected if said second means signals a need for B head data or A head data, respectively, and for causing said transport means to continue forwardly to the next block on the record, fifth means for signalling when a given block on the record passing through the reader contains data for that one of the two heads which is signalled by said second means to need data, sixth means responsive to a signal from said fifth means for causing output signals produced by said reader from the block passing therethrough to be ignored if the signalled block number for that block is less than or equal to the block number stored by said first means for the head corresponding to the A or B code read from that block, and for causing said transport means to continue forwardly to the next block on the record, seventh means for causing the output signals produced by said reader from a given block to be transferred into the data processing means if the block number read from that block is greater than the block number stored by said first means for the head corresponding to the A or B code read from that block, eighth means for actuating said transport means reversely after operation of said seventh means if said fourth means have operated subsequent to the forward starting of said transport means, ninth means for inhibiting any acceptance by the data processing apparatus of data signals produced by said reader while the latter is running reversely, and tenth means for stopping said reader when the record is returned to the beginning of that block which was first rejected due to operation of said fourth means.

4. The combination set forth in claim 3 in which the record has special codes at predetermined points therealong, and further including eleventh means for actuating said transport means reversely when (a) said fourth means have operated subsequent to the starting of the reader forwardly and (b) said reader produces output signals corresponding to a special code, thereby to limit hunting beyond a special code on the record.

5. In a system for supplying numerical information contained in successive blocks on an elongated record to data processing apparatus and servo drives for at least two independently movable machine tool heads A and B, each block containing successive rows of indicia which represent a sequential block number, an A or B to designate that the block contains data for the A or B head, and numerical data for the head motion, the A and B blocks being randomly interspersed on the record, the combination comprising, a reader having means to selectively transport the record lengthwise therethrough forwardly or reversely and means to produce output signals corresponding to the characters represented by each row of indicia as it passes, first means to start said reader forwardly in response to a signal indicating that the data processing apparatus needs more information to continue the operation of the A or B head, second means to cause the data processing apparatus to reject the reader output signals resulting from passage of an A data block or B data block through the reader whenever the data processing apparatus respectively needs more information to continue operation of B head or the A head, third means to store the block numbers for the last A data block and the last B data block accepted by and active in the data processing apparatus, fourth means for temporarily storing the number of each block while such block is passing through the reader, fifth means for comparing the temporarily stored block number with the active A block number stored by said third means when the data processing apparatus needs more A data, and with the active B block number stored by said third means when the data processing apparatus needs more B data, sixth means responsive to said comparing means for causing the data processing apparatus to reject the reader output signals resulting from passage of the corresponding block through the reader if the temporarily stored block number is not greater than the block number with which it is compared, seventh means to cause the data processing apparatus to accept and utilize the reader output signals resulting from passage of a block through the reader in the absence of operation of said second or sixth means, and eighth means for stopping the reader when it reaches the end of a block which has been accepted and for operating the reader reversely until it returns the record to the beginning of the first block which has been rejected as a result of operation of said second means.

6. The combination set forth in claim 5 further characterized in that said eighth means comprises means for stopping the reader when it reaches the end of an A or B data block which has been accepted by the data processor as a result of operation of said seventh means, means effective only if said second means has operated at least once subsequent to the forward starting of the reader for starting said reader reversely after operation of said seventh means, means for storing the block number of the first block rejected by operation of said second means, means for comparing the block number of each passing block with the block number stored by said last-named means while the reader is operating reversely, and means for stopping the reverse operation of said reader in response to said comparing means indicating that the two compared block numbers are equal.

7. In a system for supplying successive blocks of numerical command data contained on an elongated record to data processing apparatus and servo controls for A and B heads of a double headed machine tool, each block containing a plurality of successive rows of indicia representnig a sequential block number followed by an A or B designator and concluding with numerical command information respectively for the A or B head, and the A and B blocks being randomly interspersed on the record, the combination comprising a record reader having means to selectively transport the record forwardly or reversely in a lengthwise direction therethrough and means to produce output signals indicative of the identity of each indicia row as it passes, first means for signalling (NAD or NBD) when the data processing apparatus needs more data for continued operation of the A head or B head, respectively, second means responsive to any signalling (NAD or NBD) by said first means for starting said transport means forwardly, third means responsive to A or B output signals from each block of information as it passes through the reader for respectively creating signals indicative of "have A data" or "have B data" (HAD or HBD), fourth means for comparing the signals from said first and second means and producing "equal" or "not equal" signals (NH= or NH≠) when the need and the have of A or B data are respectively in agreement or disagreement, fifth means responsive to a "not equal" signal (NH≠) for rejecting the output signals produced by said reader from the passing block of the record and for causing said transport means to continue forwardly, sixth means responsive to an "equal" signal (NH=) for comparing the block number represented by reader output signals from a passing block of A or B data respectively with the block number of the last-accepted block of A or B data and for signalling ($NTR \leqq A/BNAR$) when the former number is not greater than the latter, seventh means controlled by a signal from said comparing means for rejecting the output signals produced by the reader from the passing block of the record and for causing said transport means to continue forwardly, eighth means operative in the absence of operation of said seventh means for enabling the output signals produced by said reader from the passing block to be accepted by the data processing apparatus for that one of the A or B heads which corresponds to need signalled by said first means, ninth means for actuating said transport means reversely after a block of data has been accepted by operation of said eighth means, but only in the event that said fourth means has produced at least one "not equal" (NH≠) signal subsequent to the forward starting of said transport means, tenth means for preventing any data output signals produced by said reader from being accepted by the data processing apartaus when said transport means is operating reversely, and eleventh means for stopping said transport means when the record has been returned to the beginning of that block of data the reading of which resulted in first "not equal" signal.

8. The combination set forth in claim 7 further characterized in that said eleventh means includes twelfth means for storing the block number for the first block of data read from the record after said transport means is started forwardly and which results in a "not equal" signal from said fourth means, thirteenth means rendered effective during reverse operation of said reader for signalling the block number of each block as it passes through the reader, fourteenth means for comparing the block number stored by said twelfth means with each block number signalled by said thirteenth means, and means for terminating reverse actuation of said transport means in response to said fourteenth means signalling identity of the two compared block numbers.

9. In a system for successively supplying sets of information to a data processor which supplies operating signals to at least two simultaneously operating utilization devices A and B, such information being contained in successive blocks on a record with each block including indicia representing an A or B designator code and data to be processed respectively for the operation of the A or B utilization device during a particular but unrestricted time period, and the A and B blocks being randomly interspersed on the record, the combination comprising, a record reader having a transport for selectively moving the record forwardly or reversely therethrough and means for producing output signals corresponding to the codes and data on the record as the latter passes, means for producing a first or a second signal whenever thet data processor needs additional information to continue the operation of the A or B device, means responsive to either of said first and second signals for actuating said transport forwardly, means for normally transferring the data output signals produced by said reader into the data processor, means for inhibiting the transfer of reader output signals into the processor for any block of A or B data read as a result of said transport being started forwardly in response respectively to a said first signal or a said second signal, and means responsive to the transfer of a block of information from the reader into the processor for actuating said transport reversely until the record is returned in the reader to the first block whose data has been inhibited against transfer into the processor.

10. The combination set forth in claim 9 further characterized in that said record includes indicia representing special codes interposed among the blocks at predetermined points, and including means responsive to reader output signals representative of a special code after said inhibiting means has operated for actuating said transport reversely until the record is returned in the reader to the first block whose data has been inhibited against transfer into the processor.

11. In a system for supplying successive sets of information to data processing apparatus which supplies operating signals to at least two simultaneously operating utilization devices A and B, such information being contained in blocks spaced lengthwise along an elongated record with each block including indicia representing an A or B designator followed by data for the A or B device, respectively, and the A and B blocks being randomly interspersed on the record, the combination comprising, a record reader having means to selectively transport the record forwardly or reversely therethrough and for producing output signals corresponding to the indicia represented on the record as it passes, first means for starting said transport means forwardly whenever the data processing apparatus needs additional data for the continued operation of the A or B utilization device, an A data storage device and a B data storage device associated with the data processing apparatus, second means for causing the output signals produced by said reader from an A or B block on said reader to be ignored and rejected by both said storage devices if the data processing apparatus needs additional data respectively for the operation of the B or A utilization device, third means for causing the output signals produced by said reader from an A or B block on said record to be respectively accepted by and transferred into said A or B data storage device if the data processing apparatus needs additional data for the operation of the A or B utilization device, fourth means for actuating said transport means reversely in response to operation of said third means, if said second means has operated subsequent to forward actuation of said transport, and means for stopping said transport means when the record is returned to the beginning of the first block which has been ignored and rejected.

12. The combination set forth in claim 11 further characterized in that said A data storage device includes an A temporary register and an A active register, said B storage device includes a B temporary register and a B active register, means for transferring data from the A temporary to the A active register or from the B temporary to the B active register upon the respective completion of operation of the A or B devices defined by data then in the A or B active registers, and said third means includes means for causing the output signals produced by the reader from an A or B block on the record to be respectively transferred into said A or B temporary register when the latter is "empty" due to its contents having been transferred to the associated active register.

13. The combination set forth in claim 11 further characterized in that the record contains indicia representing special codes interposed at predetermined points among the other indicia, and including means responsive to reader output signals corresponding to a special code subsequent to operation of said second means after the transport means has been started forwardly for causing said fourth means to actuate said transport means reversely independently of any operation by said third means.

14. In a system for supplying information to data processing apparatus for simultaneous operation of two servo devices A and B in accordance with numerical data contained in successive blocks on a record medium, each block including indicia representing an A or B designating that such block contains data for the A or B device, and the A and B blocks being randomly interspersed on the record, the combination comprising a record reader having means to selectively transport the record forwardly or reversely therethrough and for producing output signals corresponding to indicia representations in each block as it passes, first means for signalling (NAD or NBD) when the data processing apparatus needs more numerical data for the continued operation of the A or B servo device, respectively, second means responsive to any signalling by said first means for starting said transport means forwardly, third means for storing and signalling (HAD or HBD) the A or B designator which appears in each block on the record as it passes forwardly through said reader, fourth means responsive to said second and third means for causing the data processing apparatus to ignore and reject the output signals produced by said reader from a block of data which is not for the servo device whose need is signalled, and for causing said transport means to continue forwardly, fifth means responsive to said second and third means for causing the data processing apparatus to accept and utilize the output signals produced by said reader from a block of data which is for the servo device whose need is signalled, and sixth means responsive to the operation of said fifth means for actuating said transport means reversely until the record is returned to the first block of data which was rejected.

15. In a system for supplying information to data processing apparatus for simultaneous operation of at least two servo devices A and B in accordance with numerical data contained in successive blocks on a record, each block having indicia representing an A or B designating that such block contains data for the A or B servo device, respectively, and indicia representing numerical data, and the blocks of A and B data being randomly interspersed on the record, the combination comprising, a record reader selectively actuatable to transport the record forwardly or reversely therethrough and for producing output signals corresponding to the A or B designator and the numerical data represented in each block as it passes, first means responsive to the completion of the operation of the A or B device according to data contained in an A or B block for signalling (NAD or NBD) that more data is needed from the record for continued operation of the A or B device, respectively, second means responsive to any signalling by said first means for starting said reader forwardly, third means responsive to output signals corresponding to an A or B designator from said reader only when the latter is operating forwardly for signalling (HAD or HBD) that the block on the record passing through the reader has A or B data in it, fourth means for causing said data processing apparatus to accept and store data from any given block signalled by said reader only when the "need" and the "have" signalled by said first and third means agree (HAD·NAD or HBD·NBD), fifth means responsive to acceptance and storage of signalled data as a result of the operation of said fourth means for stopping said reader at the end of an accepted block on the record, sixth means for signalling when the reader output signals for one or more blocks of data have not been accepted by the data processing apparatus while the reader is operating forwardly, and seventh means responsive jointly to the operation of said fifth and sixth means for actuating said reader reversely until the record is returned in the reader to the first block which has not been accepted.

16. The combination set forth in claim 15, further characterized in that said data processing apparatus has A data and B data storage registers, and said fourth means comprises means responsive to an A or B signalled (HAD or HBD) by said third means for completing a transfer path from the output or said reader respectively to the input of the A or B storage register, and means responsive to disagreement between the signals from said first and third means (NAD·HBD or NBD·HAD) for resetting said third means to remove its signal (HAD or HBD) and thereby interrupt said transfer path.

17. The combination set forth in claim 15, further characterized in that each block of data on the record terminates with an end-of-block code (EL), and said fifth means includes means responsive jointly to the signalling of agreement by said first and third means (NAD·HAD or NBD·HBD) plus an end-of-block output signal from said reader for resetting said first means to remove the "need " signal (NAD or NBD), and means responsive to the disappearance of the "need" signal for stopping said reader.

18. The combination set forth in claim 15, further characterized by hunt signalling means, and characterized in that said sixth means comprises means responsive to disagreement between the signals from said first and third means (NAD·HBD or NBD·HAD) for setting said hunt signalling means to produce signals (HTA or HTB) respectively indicative of the fact that A data or B data is being hunted and that a B block or an A block has been rejected.

19. The combination set forth in claim 18, further characterized by means for signalling (ADR or BDR) when a complete block of A or B data has been read from the record and accepted, and said seventh means comprises means jointly responsive to a "hunt A" signal (HTA) or a "hunt B" signal (HTB) plus an A or B acceptance signal (ADA·HTA or BDR·HTB) for actuating said reader reversely.

20. The combination set forth in claim 15, further characterized in that each block of data on said record contains code lines indicating a sequential block number, and said seventh means comprises means to store the block number of the first block from which data has not been accepted by operation of said fourth means, means for temporarily storing the number of each block passing through the reader while the latter is operating reversely, and means for terminating reverse operation of said reader when the two stored block numbers agree.

21. The combination set forth in claim 15, further characterized in that the record contains indicia representing special codes (P or E) interposed at predetermined points among the other indicia, and further including means for actuating said seventh means in response to (a) operation of said sixth means plus (b) reader output signals corresponding to a special code, said last-named means being independent of any operation by said fifth means.

22. For use in a system for selectively supplying A or B data contained in randomly interspersed A and B blocks of indicia on a record medium to a data processor, the combination comprising means for producing a first or a second signal when the data processor respectively needs additional A or B data, means for initiating the reading of successive blocks on the record medium and producing output signals corresponding to the indicia of each block in succession, and means for transferring output signals corresponding to a given block into the data processor only when (a) such output signals represent A data and said first signal exists or (b) such output signals represent B data and said second signal exists.

23. In a system for transferring at least two types of data into data processing apparatus which controls the simultaneous operation of at least two utilization devices A and B, the combination comprising, first means for producing a first or a second signal when the data processing apparatus respectively needs additional data for continued operation of the A or B device, reader means for producing successive sets of data signas from a record medium having blocks of data serially disposed thereon with the blocks of A and B data being randomly interspersed, second means for starting said reader means in response to either a first signal or a second signal from said first means, third means for causing the reader data signals resulting from reading each block of A or B data to be ignored so long as said first means is respectively producing said second or said first signal, fourth means for transferring the reader data signals resulting from reading a block of A or B data into the data processing apparatus when said first means is respectively producing said first or said second signal, and means responsive to the operation of said fourth means for stopping said reader means.

24. In a system for supplying numerical data contained in successive blocks of an elongated record to a data processing apparatus which controls at least two utilization devices A and B for simultaneous operation thereof, each block of data including indicia representing an A or B designator and numerical data respectively for the operation of the A or B device, the A and B blocks being randomly interspersed on the record; the combination comprising, a record reader having means to transport the record therethrough and for producing output signals identifying each row of indicia as it passes, first means associated with the data processing apparatus for signalling when the latter needs additional data for the continued operation of the A device or the B device, second means for starting said reader transport means in response to any signalling by said first means, third means responsive to the reader output signals for indicating as each block on the record passes through the reader whether the block has data for the A device or the B device, fourth means for comparing the signals produced by said first and third means, means responsive to said fourth means for either (a) transferring the output signals produced by the reader from each block on the record into the data processing apparatus or (b) rejecting such signals therefrom, when the block of data being sensed is respectively (a) for the device whose need is signalled or (b) for the device whose need is not signalled, and means for stopping said transport means after completion of transfer of one block of data into the data processing apparatus.

25. In a system for supplying numerical data contained in successive blocks of an elongated record to data processing apparatus and servo drives for a machine tool having at least two independently movable heads A and B, each block of data including successive rows of indicia representing an A or B code followed by numerical data for the A or B head, respectively, and the blocks of A and B data being randomly interspersed on the record, the combination comprising a record reader having means for transporting the record forwardly so that the blocks pass in sequence therethrough and for creating output signals indicative of each row of indicia as it passes, means for creating a first signal (NAD) when the data processing apparatus needs more data from the record for continued operation of the A head, means for creating a second signal (NBD) when the data processing apparatus needs more data from the record for continued operation of the B head, means responsive to either of said first or second signals for starting said reader forwardly, means responsive to the appearance of A or B code output signals from said reader for respectively producing third or fourth signals (HAD or HBD) respectively indicating that the record block passing through said reader contains data for the A or B head, means responsive to the simultaneous existence of said first and fourth signals (NAD·HBD) or said second and third signals (NBD·HAD) for preventing the transfer of output signals from said reader to the data processing apparatus and permitting said reader to continue forwardly, means responsive to the simultaneous existence of said first and third signals (NAD·HAD) or said second and fourth signals (NBD·HBD) for transferring the output signals from said reader to the data processing apparatus for use respectively in controlling the operation of the A head or B head, and means for stopping said reader after said last-named means has caused a complete block of information to be transferred to said data processing apparatus, whereby said tape reader hunts forwardly on the record to locate and accept the first block of A data or B data, when the system needs A data or B data, respectively, and ignores any intervening blocks of B data or A data, respectively.

26. In a system for supplying data contained in successive blocks of an elongated record to data processing apparatus and servo drives for a machine tool having at least two independently movable heads A and B, each block of data including successive rows of indicia on the record representing an A or B code followed by numerical data for the A or B head, respectively, and terminating in an end-of-block (EL) representation, the blocks of A and B data being randomly interspersed on the record, the combination comprising a record reader having means for transporting the record lengthwise therethrough and for creating output signals identifying each row of indicia as it passes, means for creating a first persisting signal (NAD) when the data processing apparatus needs more data for continued operation of the A head, means for creating a second persisting signal (NBD) when the data processing apparatus needs more data for the continued operation of the B head, means for starting said tape reader in response to either of said first and second signals, means responsive to an A code output signal from said reader for producing a third persisting signal (HAD), means responsive to a B code output signal from said reader for producing a fourth persisting signal (HBD), means responsive to simultaneous existence of said first and fourth signals (NAD·HBD) or said second and third signals (NBD·HAD) for producing a persisting reject signal (RJB), means responsive to said reject signal for terminating that one of said third and fourth signals (HAD of HBD) which then exists, means responsive to an end-of-block output signal (EL) for terminating said reject signal, means responsive to the existence of said third or fourth signals (HAD or HBD) for transferring said reader output signals into the data processing apparatus, and means responsive to the occurrence of an end-of-block signal (EL) from said reader while said third or fourth signal (HAD of HBD) exists for respectively terminating that one of said first or second signal (NAD or NBD) which then exists and thereby stopping said reader, whereby said reader hunts the record to find and accept a block of data for the head which needs data and stops at the end of such blocks, all intervening blocks of data for the other head being ignored.

27. In a system wherein a record medium is searched forwardly and reversely to supply signals corresponding to blocks of information read from the record medium into data processing apparatus, each block of information including a sequential block number, the combination comprising first means for storing and signalling the block number for the last block of information transferred to the data processing apparatus, second means for temporarily storing and signalling the block number for each block of information as it is being read from the record medium, and third means for transferring signals corresponding to a block of information being read from the record into the data processing apparatus only when the block number stored by said second means is greater than the block number stored by said first means.

28. The combination set forth in claim 27, further characterized by means for transferring the block number stored in said second means into said first means as an incident to operation of said third means.

29. In a system for supplying successive sets of numerical data contained in successive blocks of a record medium into data processing apparatus, each block including indicia representing a sequential block number followed by numerical data, the combination comprising a record reader having means to produce sets of output signals corresponding to the indicia of each successive block on the record medium as the latter passes through the reader, first means for normally transferring the numerical data signals for each block into said data processing apparatus for utilization thereby, second means for storing the block number of the last set of signals so transferred, third means for temporarily storing the block number signals of each set of output signals prior to transfer of the latter into the data processing apparatus, means for comparing the two block numbers respectively stored by said second and third means, and means controlled by said comparing means to disable said first means and prevent transfer of a given block of data signals whenever said temporarily stored block number is less than or equal to the block number stored in said second means, whereby data from a given block on the record medium after having been once transferred into the data processing apparatus is not so transferred when that block is subsequently passed through the reader.

30. The combination set forth in claim 29, further characterized by means for transferring the block number stored in said third means into storage by said second means as an incident to operation of said first means.

31. The combination set forth in claim 29, further characterized in that the record medium contains randomly interspersed A data and B data blocks and the successive sets of reader output signals include an A or B signal indicative of the nature of the data in the block being read, said first means includes means for normally transferring the numerical data signals from an A data block or B data block into A or B data portions of the data processing apparatus, said second means includes means for storing the block number for the last A data block and the last B data block so transferred, and said comparing means includes means for comparing the block number stored by said third means with either the A data block number or the B data block number stored by said second means when the reader output signals respectively indicate that data in the block being read is A or B data.

32. In a system for supplying numerical information into a data processor which controls the simultaneously executed operations of at least two utilization devices A and B, such numerical information being represented in successive blocks on a record medium with each block containing indicia representing a sequential block number, an A or B designator code, and numerical command data to be respectively used in the control of the A or B device, the combination comprising a record reader having means selectively actuatable to transport the record medium forwardly or reversely and means for producing output signals corresponding to the indicia of each block as it passes, first means responsive to a need by the data processor for either A or B data to continue the operation of the A or B device for actuating said transport means forwardly and for transferring the reader output signals resulting from a given block into the data processor only if such block contains data of the type needed, so that the reader continues to run through and the system rejects the output signals of the reader resulting from blocks containing the type of data not needed, second means responsive to the completion of the transfer by said first means for actuating said transport means reversely to return the first block on the record medium previously rejected into a reading position in the reader, a temporary storage register, third means responsive to the reader output signals for storing the block number of each block in said temporary storage register during the time that such block is passing through the reader, an active A block number storage register and an active B block number storage register, means responsive to the reader output signals for storing in the active A or B register the block number of the last A or B data block which has been transferred by said first means into the data processor, means for comparing the block number held in said temporary register as a result of reading an A or B data block with the block number respectively held in said active A or active B register and for producing an indicator signal if the former number is not greater than the latter number, and means responsive to said indicator signal for preventing said first means from transferring the reader output signals resulting from a given block into the data processor even though such block contains data of the type needed, whereby a given type of data may be hunted several times, but blocks containing such type of data will be transferred into the data processor only the first time they are read, and will be ignored when read thereafter.

33. In a system for supplying numerical information contained in successive blocks on a record medium into data processing apparatus, each block containing indicia representing a sequential block number followed by numerical data, the combination comprising, a record reader having means selectively actuatable to transport the record medium forwardly and reversely therethrough and means to produce output signals representing the indicia in a block as its passes, first means for normally transferring the output signals into the data processing apparatus as the record is being transported forwardly, second means for selectively inhibiting the transfer of the output signals resulting from certain blocks on the record medium as the latter is being transported forwardly so that such certain blocks are rejected, third means for storing the reader output signals representing the block number of the first block rejected, fourth means for actuating said transport means reversely after at least one block has been rejected and the output signals corresponding to another block have been transferred by said first means into the data processing apparatus, fifth means for momentarily signalling the block number of each block as it is being transported reversely through the reader, and sixth means for stopping said transport means when the block number stored by said third means and the momentarily signalled block number are equal.

34. The combination set forth in claim 33, further characterized by seventh means for preventing the transfer of the reader output signals into said data processing apparatus while said transport means is operating reversely.

35. The combination set forth in claim 33, further characterized in that said third means includes a shifting register into which the digits of a block number represented by output signals of said reader are shifted in the sequence read and in descending order when the record medium is being transported forwardly, a storage register and means to transfer the number received by said shifting register into such storage register, said fifth means includes means for shifting the digits of each block number represented by output signals of said reader into said shifting register in the sequence read and in ascending order when the record medium is being transported reversely, and said sixth means includes means for comparing the block numbers stored in said storage register and said shifting register with one such number reversed in order to stop said transport means when the record medium has been returned to the first rejected block.

36. In a system for supplying numerical information contained in successive blocks of a record medium into data processing apparatus, each block containing successive rows of coded indicia representing a sequential block number followed by numerical data to be utilized by such apparatus, the combination comprising, a reader for producing output signals representing the indicia in each row of the record medium as the latter passes therethrough, a drive mechanism actuatable to selectively transport the record medium forwardly or reversely through said reader, first means normally enabled when said mechanism is actuated forwardly for transferring the reader output signals representing numerical data as they occur into the data processing apparatus, second means for selectively disabling said first means so the numerical data signals for certain blocks are not transferred and such blocks are rejected, a shift register, third means for shifting the reader output signals resulting from block numbers represented in each block into said shift register when said mechanism is actuated both forwardly and reversely, a storage register, fourth means responsive to the first operation of said second means, and thus the first rejection of a block, after said mechanism is actuated forwardly, for dumping the contents of said shift register into said storage register, means for actuating said mechanism reversely in response to the operation of said first means subsequent to an operation of said second means, and means for terminating the reverse actuation of said mechanism when the block number held by said shift register becomes equal to that held in said storage register.

37. In a system for supplying numerical information contained in successive blocks of a record medium into data processing apparatus which controls at least two simultaneously operating utilization devices A and B, each block on the record containing indicia representing an A or B designator and numerical data for the operation of the A or B device, and the A and B blocks being randomly interspersed on the record medium, the record medium further having indicia representing recoordination codes at predetermined locations, the combination comprising a record reader including a transport selectively actuatable to move the record medium forwardly and reversely therethrough and means to produce output signals corresponding to the indicia within each block as it passes, first means for signalling when the data processing apparatus needs additional A or B data, second means responsive to any signalling by said first means for starting said transport forwardly, third means for producing an A or B signal indicating that each block contains A or B data as that block on the record medium passes forwardly through said reader, fourth means for transferring data signals produced by said reader from a given block into the data processing apparatus only when the need signal from said first means agrees with indicating signal from said third means, whereby data signals produced by the reader from A or B data blocks when there is a need respectively for B or A data are ignored and the record medium is driven forwardly to hunt for needed type of data, fifth means for stopping said transport after each transferring operation of said fourth means, sixth means for indicating that a block of data has been ignored and hunting has been started, seventh means, responsive jointly to (a) output signals from said reader corresponding to a recoordination code and (b) an indication from said sixth means, for stopping said transport independently of said fourth means, thereby to prevent hunting of the record for data corresponding to the needed data beyond a recoordination code.

38. In a system for supplying numerical information contained in blocks on successive portions of a record medium to data processing apparatus which controls at least two simultaneously operating utilization devices A and B, each block on the record medium containing indicia representing an A or B designator and numerical data for the respective operation of the A or B devices, and the A and B blocks being randomly interspersed on the record medium, the record medium further having indicia representing recoordination codes at predetermined locations, the combination comprising, a record reader including a transport selectively actuatable to move the record medium forwardly or reversely therethrough, and means to produce output signals corresponding to each block as it passes, first means to produce NAD or NBD signals when the data processing apparatus respectively needs additional A or B data for the continued operation of the A or B device, second means responsive to the reader output signals corresponding to A or B designators for producing HAD or HBD signals when the block on the record medium passing through said reader respectively contains A or B data, third means for actuating said transport forwardly in response to either a NAD or NBD signal from said first means, fourth means for transferring the data output signals for a given block into the data processing apparatus only when the signal from said second means agrees with the signal from said first means thereby indicating that the block contains A or B data and that A or B data is respectively needed, whereby the record medium will continue forwardly through the reader and the data output signals from blocks not agreeing with the needed data will be ignored until a block satisfying the need is found, fifth means for producing a hunt signal in response to a block of data being ignored, sixth means for storing signals identifying the first block of data which is ignored subsequent to forward actuation of the transport, seventh means for terminating forward actuation of said transport in response to operation of said fourth means, eighth means responsive to operation of said seventh means for actuating said transport reversely until the record medium is returned to the first previously ignored block identified by signals from said fifth means, ninth means jointly responsive to (a) reader output signals corresponding to a recoordination code and (b) a hunt signal from said fifth means for terminating forward actuation of said transport independently of said seventh means in the event that a block of data has been ignored, and tenth means responsive to operation of said ninth means for actuating said eighth means independently of the seventh means, whereby hunting forwardly on the record medium cannot proceed beyond a recoordination code.

39. The combination set forth in claim 38, further characterized by eleventh means responsive to operation of said ninth means for preventing said first means from producing a NAD or NBD signal when A or B data respectively are being hunted at the time the ninth means operated, so that the data processing apparatus continues to have a need respectively for A or B data but the transport is re-started forwardly only in response respectively to a further need for B or A data.

40. The combination set forth in claim 39, further characterized by means for disabling said eleventh means in response to reader output signals corresponding to a recoordination code occurring after said transport has been re-started forwardly subsequent to operation of said eleventh means.

41. In a system for supplying numerical information contained in successive blocks of a record medium into a data processor which controls at least two simultaneously operable utilization devices A and B, each block on the record containing indicia representing an A or B designator and numerical data for the respective operation of the A or B device, the A and B blocks being randomly interspersed on the record medium, and the record medium having special code indicia at predetermined points therealong, the combination comprising a reader including a transport selectively actuatable to move the record medium forwardly or reversely therethrough and means to produce output signals corresponding to the indicia within each block as it passes, means for producing first (NAD) or second (NBD) signals when the data processor needs additional data for the continued operation of the A or B device, respectively, means responsive to either of said first or second signals for actuating said transport forwardly, control means effective while said transport is actuated forwardly and responsive to said first or second signal for (a) transferring the reader output signals resulting from a block containing the needed type of data into the data processor and thereupon terminating forward actuation of said transport, or (b) inhibiting the transfer of reader output signals resulting from a block containing data of the type not needed and continuing the forward actuation of said transport, whereby the record medium is normally driven forwardly until the needed type of data is found and any intervening blocks containing data of the type not needed are rejected, and means responsive to reader output signals corresponding to said special code for independently terminating forward actuation of said transport and stopping the record medium, so that hunting for the needed type of data does not progress beyond the point at which such a special code appears on the record medium.

42. The combination set forth in claim 41, further including means for producing an indicator signal (HTO) whenever said control means inhibits transfer of output signals from at least one block after the transport has been started forwardly, means responsive to deactuation of said transport by said control means after transfer of block output signals and to simultaneous existence of said indicator signal for actuating said transport reversely until the first rejected block on the record medium is returned to the reader, and said means responsive to a reader output signal corresponding to said special code includes not only means for independently terminating forward actuation of said transport but also means then responsive to the existence of said indicator signal for actuating said transport reversely until the first rejected block on the record medium is returned to the reader.

43. In a system for supplying numerical information contained in blocks on successive portions of a record medium to data processing apparatus which controls at least two simultaneously operating utilization devices A and B, each block on the record medium containing indicia representing an A or B designator and numerical data for the respective operation of the A or B device, and the A and B blocks being randomly interspersed on the record medium, the record medium further having a special code at various locations thereon designating that the supplying of information is to be stopped, the combination comprising a record reader including a transport selectively actuatable to move the record medium forwardly or reversely therethrough, and means for producing output signals corresponding to each block as it passes, first means for signalling (NAD or NBD) when the data processing apparatus needs additional A or B data, second means responsive to any signalling by said first means for starting said transport forwardly, third means for producing an A or B signal as each block on the record medium passes forwardly through the reader to thereby indicate that such block contains A or B data, fourth means for transferring data signals produced by said reader from a given block into the data processing apparatus only when the need signal from the first means agrees with the indicating signal from said third means, whereby data signals produced by the reader from A or B data blocks when there is a need respectively for B or A data are ignored and the record medium is driven forwardly to hunt for the needed type of data, fifth means for stopping said transport after each operation of said fourth means, sixth means for producing a hunt signal when a block of data has been ignored and hunting has taken place, seventh means for stopping said transport independently of said fourth means in response to reader output signals corresponding to said special code, and eighth means responsive stopping of said transport by said fifth or seventh means and to the simultaneous existence of a hunt signal from said sixth means for actuating said transport reversely until the first block ignored on the record medium is returned to the reader, whereby the operations of the data processing apparatus and the utilization devices will be stopped only when the execution of all data appearing on the record medium ahead of the special code is completed, and before the execution of any data appearing on the record medium subsequent to the special code.

44. The combination set forth in claim 43, further characterized by ninth means for preventing said first means from producing a signal indicative of a need for A data or B data in response to the simultaneous existence of (a) reader output signals corresponding to said special code and (b) a hunt signal from said sixth means indicating there has been hunting respectively for A data or B data.

45. In a system for supplying numerical information contained in blocks on successive portions of a record medium to data processing apparatus which controls at least two simultaneously operating utilization devices A and B, each block on the record medium containing indicia representing an A or B designator and numerical dota for the respective operation of the A or B device, and the A and B blocks being randomly interspersed on the record medium, the record medium having at least one type of special stop code at various locations thereon designating that the operations of the system are to be stopped, the combination comprising, a record reader including a transport selectively actuatable to move the record medium forwardly and reversely therethrough, and means for producing output signals corresponding to each block as it passes, first means for producing NAD or NBD signals when the data processing apparatus respectively needs additional A data or B data, second means responsive to any signalling by said first means for actuating said transport forwardly, third means responsive to an output signal from the reader for respectively producing a HAD or HBD signal while a block respectively containing A or B data is passing through the reader, fourth means responsive to HAD·NAD signals or to HBD·NBD signals for transferring the output signals from a block which results in such HAD or HBD signals into the data processing apparatus and stopping said transport at the end of that block, hunt A and hunt B signalling devices, fifth means responsive to HBD·NAD signals or to HAD·NBD signals for respectively setting said hunt A or hunt B device, and permitting said transport to continue forwardly, whereby blocks of B or A data are respectively ignored until a block of A data or B data is found on the record when a need for A or B data respectively exists, sixth means responsive to a stop code output signal from said reader for stopping said transport, seventh means responsive to operation of either said fourth means or said sixth means when either said hunt A or hunt B device is set for actuating said transport reversely until the record medium is returned in the reader to the first block ignored, eighth means responsive to the operation of said sixth means when said hunt A or hunt B device is set for respectively terminating the NAD or NBD signal produced by said first means even though the data processing apparatus still respectively needs additional A or B data, and ninth means for resetting said hunt A and hunt B devices in response to completion of the operation of said seventh means.

References Cited

UNITED STATES PATENTS

| | | | |
|---|---|---|---|
| 3,287,545 | 11/1966 | Burnett et al. | 235—51.11 |
| 3,297,929 | 1/1967 | Gardner et al. | 318—162 |
| 3,302,180 | 1/1967 | Donohoe et al. | 340—172.5 |
| 3,351,907 | 11/1967 | Cordes | 340—147 |

PAUL J. HENON, *Primary Examiner.*

R. B. ZACHE, *Assistant Examiner.*

U.S. Cl. X.R.

235—61.7, 151.11